(12) United States Patent
Helferty et al.

(10) Patent No.: US 10,200,748 B2
(45) Date of Patent: *Feb. 5, 2019

(54) SYSTEM AND METHOD FOR COMMERCIAL DETECTION IN DIGITAL MEDIA ENVIRONMENTS

(71) Applicant: SPOTIFY AB, Stockholm (SE)

(72) Inventors: Nikhil Helferty, New York City, NY (US); Eric Hoffert, New York City, NY (US)

(73) Assignee: SPOTIFY AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/425,878

(22) Filed: Feb. 6, 2017

(65) Prior Publication Data
US 2017/0150211 A1    May 25, 2017

Related U.S. Application Data

(63) Continuation of application No. 14/500,561, filed on Sep. 29, 2014, now Pat. No. 9,565,456.

(51) Int. Cl.
*H04N 21/44* (2011.01)
*H04N 21/234* (2011.01)
(Continued)

(52) U.S. Cl.
CPC ....... *H04N 21/44008* (2013.01); *G06Q 30/02* (2013.01); *G06Q 30/0241* (2013.01);
(Continued)

(58) Field of Classification Search
CPC ........... H04N 21/23424; H04N 21/812; H04N 21/2668; H04N 21/454
(Continued)

(56) References Cited

U.S. PATENT DOCUMENTS 5,818,439 A   10/1998   Nagasaka et al.
6,006,257 A   12/1999   Slezak
(Continued)

OTHER PUBLICATIONS

Duan et al., "Segmentation, Categorization, and Identification of Commercials from TV Streams Using Multimodal Analysis", pp. 201-210.*

(Continued)

*Primary Examiner* — An Son P Huynh
(74) *Attorney, Agent, or Firm* — Tucker Ellis LLP

(57) ABSTRACT

In accordance with an embodiment, described herein is a system and method for providing commercial (advertisement) detection in digital media environments. A media stream, for example, a video stream of television shows or movies, can be analyzed either in advance or in realtime, to determine commercial segments or blocks within the media stream, and to distinguish them from (non-commercial) content segments or blocks. In accordance with an embodiment, frame features, black spaces, cue points, or other segment or block information can be used to improve the accuracy and precision with which commercials are identified. Particular commercials can be identified, together with information as to the location of those commercials within the media stream. In accordance with an embodiment, the media streams can be used within an on-demand cloud-based media environment, which allows a user to select within a plurality of media channels, or to locate or skip particular commercials.

20 Claims, 14 Drawing Sheets

(51) Int. Cl.
*H04N 21/81* (2011.01)
*H04N 21/2747* (2011.01)
*H04N 21/239* (2011.01)
*G06Q 30/02* (2012.01)
*H04N 21/438* (2011.01)
*H04N 21/454* (2011.01)

(52) U.S. Cl.
CPC ... *H04N 21/2393* (2013.01); *H04N 21/23418* (2013.01); *H04N 21/2747* (2013.01); *H04N 21/4383* (2013.01); *H04N 21/44004* (2013.01); *H04N 21/4542* (2013.01); *H04N 21/812* (2013.01); *H04N 21/8113* (2013.01)

(58) Field of Classification Search
USPC .............................................. 725/32, 34–36
See application file for complete search history.

(56) References Cited

U.S. PATENT DOCUMENTS

| | | | | |
|---|---|---|---|---|
| 7,117,517 | B1* | 10/2006 | Milazzo | G06F 17/30855 375/E7.008 |
| 8,839,306 | B2* | 9/2014 | Roberts | H04N 7/17318 725/11 |
| 8,903,167 | B2 | 12/2014 | Kohli et al. | |
| 8,925,024 | B2* | 12/2014 | Wright | G06K 9/00765 725/105 |
| 9,510,044 | B1* | 11/2016 | Pereira | H04N 21/44008 |
| 9,635,417 | B2* | 4/2017 | Grant | H04N 21/44008 |
| 9,681,105 | B2* | 6/2017 | Walker | H04N 7/163 |
| 2004/0010480 | A1* | 1/2004 | Agnihotri | G06N 3/086 706/20 |
| 2004/0133909 | A1 | 7/2004 | Ma | |
| 2004/0189873 | A1 | 9/2004 | Konig et al. | |
| 2004/0221311 | A1* | 11/2004 | Dow | G06F 17/30784 725/52 |
| 2004/0260682 | A1 | 12/2004 | Herley et al. | |
| 2005/0028208 | A1* | 2/2005 | Ellis | H04N 7/163 725/58 |
| 2005/0289587 | A1* | 12/2005 | Chiu | H04N 21/44008 725/34 |
| 2006/0171274 | A1* | 8/2006 | Moon | G11B 19/04 369/53.2 |
| 2006/0187358 | A1* | 8/2006 | Lienhart | G06K 9/3266 348/661 |
| 2006/0248569 | A1* | 11/2006 | Lienhart | H04N 5/76 725/135 |
| 2007/0154168 | A1 | 7/2007 | Cordray et al. | |
| 2007/0154169 | A1* | 7/2007 | Cordray | H04N 5/44543 386/230 |
| 2007/0156521 | A1* | 7/2007 | Yates | G06Q 10/101 705/300 |
| 2007/0203945 | A1* | 8/2007 | Louw | G06Q 30/02 |
| 2008/0040740 | A1 | 2/2008 | Plotnick et al. | |
| 2008/0127244 | A1* | 5/2008 | Zhang | H04N 5/147 725/32 |
| 2008/0201731 | A1* | 8/2008 | Howcroft | H04H 60/46 725/13 |
| 2008/0222201 | A1* | 9/2008 | Chen | G06F 17/30265 |
| 2008/0301750 | A1 | 12/2008 | Silfvast et al. | |
| 2009/0193456 | A1 | 7/2009 | Ahn et al. | |
| 2010/0031162 | A1* | 2/2010 | Wiser | G06Q 30/0255 715/747 |
| 2010/0095325 | A1* | 4/2010 | Urdang | G06F 3/0482 725/32 |
| 2010/0114345 | A1* | 5/2010 | Conejer Olesti | G06F 17/30743 700/94 |
| 2011/0239078 | A1* | 9/2011 | Luby | H04N 21/23106 714/752 |
| 2011/0243533 | A1 | 10/2011 | Stern et al. | |
| 2012/0042247 | A1* | 2/2012 | Harper | G06Q 30/02 715/716 |
| 2012/0047542 | A1 | 2/2012 | Lewis et al. | |
| 2012/0093476 | A1* | 4/2012 | Mountain | H04N 21/4312 386/230 |
| 2012/0099795 | A1* | 4/2012 | Jojic | G06K 9/3266 382/199 |
| 2012/0116883 | A1* | 5/2012 | Asam | G06Q 30/0251 705/14.58 |
| 2012/0288186 | A1* | 11/2012 | Kohli | G06K 9/6256 382/159 |
| 2013/0031582 | A1* | 1/2013 | Tinsman | H04N 21/2353 725/36 |
| 2013/0091521 | A1 | 4/2013 | Phillips et al. | |
| 2013/0263182 | A1* | 10/2013 | Ivy | H04N 21/458 725/34 |
| 2013/0276033 | A1* | 10/2013 | Francini | H04N 5/44543 725/50 |
| 2013/0291002 | A1 | 10/2013 | Rothschild et al. | |
| 2014/0007162 | A1* | 1/2014 | Harrison | H04L 63/10 725/35 |
| 2014/0114455 | A1* | 4/2014 | Larsen | H04H 60/375 700/94 |
| 2014/0173650 | A1* | 6/2014 | Mathews | H04N 21/4331 725/32 |
| 2014/0282681 | A1* | 9/2014 | Carney | H04N 21/4331 725/28 |
| 2015/0142404 | A1 | 5/2015 | Spencer et al. | |
| 2015/0143404 | A1* | 5/2015 | Byers | G06Q 30/0251 725/32 |
| 2015/0163559 | A1* | 6/2015 | Manchester | H04N 21/812 725/34 |

OTHER PUBLICATIONS

Actus, "Actus AdWatch—Automatic Content Detection & Ad Tracking", 2008, 2 pages. Retrieved from: http://en.wikipedia.org/wiki/Cue_mark#Cue_marks_in_television.

Adhikari, et al., "Abrupt Scene Change Detection", World Academy of Science, Engineering and Technology, 2008, vol. 42, pp. 711-716, 6 pages.

Albiol, et al., "Detection of TV Commercials", IEEE International Conference on Acoustics, Speech, and Signal Processing, May 2004, vol. 3., 4 pages.

Anguera, TV Advertisements Detection and Clustering Based on Acoustic Information, International Conference on Computational Intelligence for Modeling Control & Automation, Dec. 2008, pp. 452-457, 6 pages.

Ben-Shushan, "Seamless ad insertion", Aug. 1, 2008, 3 pages. Retrieved from: http://broadcastengineering.com/infrastructure/seamless-ad-insertion.

BlackArrow, BlackArrow Unveils Product and Partner Initiatives for Monetization of Linear IP TV, May 30, 2013, 1 page. Retrieved from: http://www.blackarrow.tv/about-us/news-press/blackarrow-unveils-product-and-partner-initiatives-for-monetization-of-linear-ip-tv/.

Covell, et al., "Advertisement Detection and Replacement using Acoustic and Visual Repetition", IEEE 8th Workshop on Multimedia Signal Processing, Oct. 2006, pp. 461-466, 6 pages.

Dimitrova, et al., "Real Time Commercial Detection Using MPEG Features", 2002, 6 pages.

Duan, et al., "Digesting Commercial Clips from TV Streams", 2008, pp. 28-41, 14 pages.

Hua, et al., "Robust Learning-Based TV Commercial Detection", IEEE International Conference on Multimedia and Expo., Jul. 2005, 4 pages.

Ipharro, "iPharro Media AdMon Automated TV Advertisement Monitoring", 2010, 2 pages. Retrieved from: http://www.ipharro.com/images_2010/PDF_2010/.

Jang, et al., "Automatic Commercial Monitoring for TV Broadcasting Using Audio Fingerprinting", AES 29th International Conference, Seoul, South Korea, Sep. 2006, 6 pages.

Lienhart, et al., On the Detection and Recognition of Television Commercials, IEEE International Conference on Multimedia Computing and Systems, Jun. 1997, pp. 1-17, 17 pages.

(56) References Cited

OTHER PUBLICATIONS

Liu, et al., "Time-Constraint Boost for TV Commercials Detection", International Conference on Image Processing, Oct. 2004, vol. 3., pp. 1617-1620, 4 pages.

Mizutani, et al., Commerical Detection in Heterogeneous Video Streams Using Fused Multi-Modal and Temporal Features, Columbia University Advent Technical Report No. 204, 2004, 21 pages.

MythTV Developers, MythTV, Open Source DVR, 1 pages. Retrieved from: http://www.mythtv.org/.

MythTV Official Wiki, Wiki, Commerical Detection, 3 pages. Retrieved from: http://www.mythtv.org/wiki/Commercial_detection.

MythTV Official Wiki, MythTV Commercial Detection in the UK, 13 pages. Retrieved from: http://www.mythtv.org/wiki/Commercial_detection_in_the_UK.

Sadlier, et al.,"Automatic TV Advertisement Detection from MPEG Bitstream", 2002, 20 pages.

Satterwhite, et al., "Automatic detection of TV commercials", IEEE Potentials, vol. 23, Apr.-May 2004, pp. 9-12, 4 pages.

Schoffmann, et al., A Novel Approach for Fast and Accurate Commercial Detection in H.264/AVC Bit Streams Based on Logo Identification, Proceeding MMM '02, Proceedings of the 15th International Multimedia Modeling Conference on Advances in Multimedia Modeling, 2009, pp. 119-127, 9 pages.

Snap Stream, "TV Monitoring Software That Just Works", 6 pages. Retrieved from: http://www.snapstream.com/enterprise.

Turpin, et al., Commercial Detection in MythTV using Bayesian and Neural Networks, 7 pages.

Unknown Author, "Compskip Varient—SageTV Community", SageTV Customizations, 8 pages. Retrieved from: http://forums.sagetv.com/forums/showthread.php?t=12474.

Unknown Author, "Cue Mark", 5 pages. Retrieved from: http://en.wikipedia.org/wiki/Cue_mark#Cue_marks_in_television.

Unknown Author, "Magine" From Wikipedia, 2 pages. Retrieved from: http://en.wikipedia.org/wiki/Magine.

Unknown Author, "TVCR Commercial Detection", 1 page. Retrieved from: https://code.google.com/p/tvcr/.

Unknown Author, "Video Genome Project", 1 page. Retrieved from http://v-nome.org/index.html.

Vatolin, et al., "MSU TV Commercial Detector", 5 pages. Retrieved from: http://www.compression.ru/video/tv_commercial_detector/index_en.html.

* cited by examiner

SYSTEM AND METHOD FOR COMMERCIAL DETECTION IN DIGITAL MEDIA ENVIRONMENTS

CLAIM OF PRIORITY

This application is a continuation of U.S. patent application titled "SYSTEM AND METHOD FOR COMMERCIAL DETECTION IN DIGITAL MEDIA ENVIRONMENTS", application Ser. No. 14/500,561, filed Sep. 29, 2014, subsequently issued as U.S. Pat. No. 9,565,456 on Feb. 7, 2017; which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to the providing of digital media content, for example as streamed television or other types of media, and are particularly related to a system and method for detection of commercials in such environments.

BACKGROUND

The digital media industry has evolved greatly within the past several years, with consumers now able to access large amounts of media content, for example music, videos, television shows, and movies, at any location or time of day, using a wide variety of computing systems, handheld entertainment devices, smartphones, or other types of media device.

Media content can be delivered by various means, including allowing users to download individual media items, such as songs or movies, to a particular device for later offline playback; or to access streamed channels of media content being broadcast in realtime to multiple devices, in a manner similar to broadcast or cable television.

Advances in network technology have increased the speed and reliability with which media content can be transmitted to individual media devices. This has enabled functionality such as allowing a user to be able to select between media streams or channels in an on-demand fashion, rather than tuning to a particular channel to receive a predefined transmission. Features that enhance the user's ability to access, view, and switch between different media channels can improve the overall user experience. These are generally the types of environments in which embodiments of the invention can be used.

SUMMARY

In accordance with an embodiment, described herein is a system and method for providing commercial (advertisement) detection in digital media environments. A media stream, for example, a video stream of television shows or movies, can be analyzed either in advance or in realtime, to determine commercial segments or blocks within the media stream, and to distinguish them from (non-commercial) content segments or blocks. In accordance with an embodiment, frame features, black spaces, cue points, or other segment or block information can be used to improve the accuracy and precision with which commercials are identified. Particular commercials can be identified, together with information as to the location of those commercials within the media stream. In accordance with an embodiment, the media streams can be used within an on-demand cloud-based media environment, which allows a user to select within a plurality of media channels, or to locate or skip particular commercials.

DETAILED DESCRIPTION

As described above, advances in digital media and network technology have increased the speed and reliability with which media content can be transmitted to individual media devices, which enables functionality such as allowing a user to be able to select between media streams or channels in an on-demand fashion. Features that enhance the user's ability to access, view, and switch between different media channels can improve the overall user experience.

In accordance with an embodiment, described herein is a system and method for providing commercial (advertisement) detection in digital media environments. A media stream, for example, a video stream of television shows or movies, can be analyzed either in advance or in realtime, to determine commercial segments or blocks within the media stream, and to distinguish them from (non-commercial) content segments or blocks.

In accordance with an embodiment, frame features, black spaces, cue points, or other segment or block information can be used to improve the accuracy and precision with which commercials are identified. Particular commercials can be identified, together with information as to the location of those commercials within the media stream.

In accordance with an embodiment, the media streams can be used within an on-demand cloud-based media environment, which allows a user to select within a plurality of media channels, or to locate or skip particular commercials.

Figure 1:
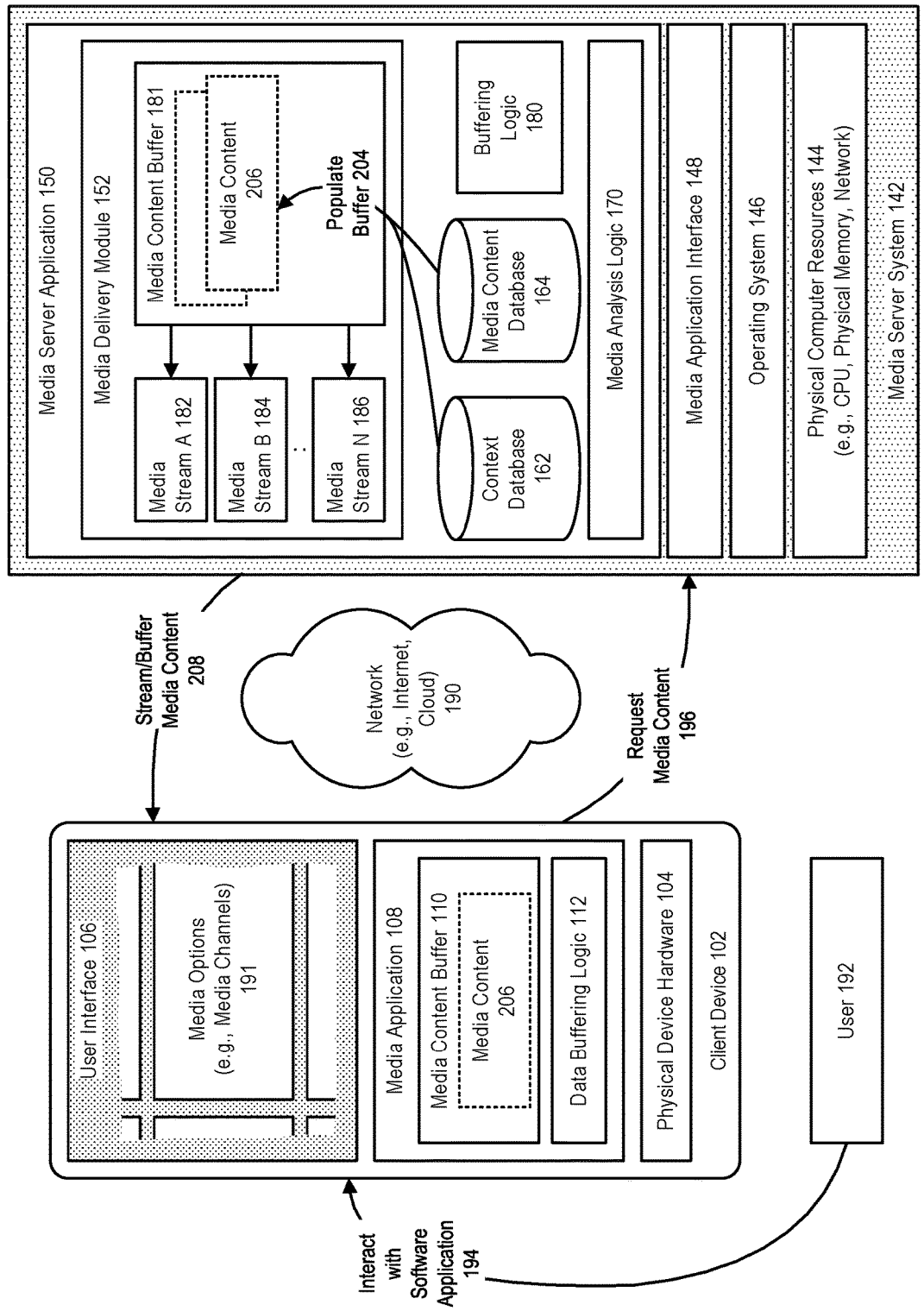
FIG. 1 illustrates a system for providing commercial detection in digital media environments, in accordance with an embodiment.

FIG. 1 illustrates a system for providing commercial detection in digital media environments, in accordance with an embodiment.

As shown in FIG. 1, in accordance with an embodiment, a client device 102 can be used to receive and play media content that is provided by a media server system 142 (media server), or by another system or peer device. In accordance with an embodiment, the client device can be, for example, a personal computer system, mobile electronic device, handheld entertainment device, wearable computing device, laptop, tablet computer, mobile phone or smartphone, digital media player, television, or other type of electronic or media device that is adapted or able to prepare a media content for presentation, control the presentation of media content, and/or play or otherwise present media content.

In accordance with an embodiment, each of the client device and the media server can include, respectively, one or more physical device or computer hardware resources 104, 144, such as one or more processors (CPU), physical memory, network components, or other types of hardware resources.

Although, for purposes of illustration, FIG. 1 illustrates a single client device and a single media server, in accordance with an embodiment, a media server can support the simultaneous use of a plurality of client devices. Similarly, in accordance with an embodiment, a client device can access media content provided by a plurality of media servers, including switching between different media streams, or between different television channels produced by one or more media servers.

In accordance with an embodiment, each client device can also, in some instances, act as a media server, to share media content stored at a particular client device with another client device, in a peer-to-peer manner.

Client Devices and Controlled Devices

As described above, in accordance with an embodiment, the client device can be an electronic or media device that is able to prepare, control, and/or play or present a media content, such as, for example, a tablet computer, smartphone, or other media device.

As further shown in FIG. 1, in accordance with an embodiment, the client device can include a user interface 106, which is adapted to display or otherwise provide a visual array of media options, for example as a two-dimensional array of media tiles, thumbnails, or other format, and to determine a user interaction or input.

In accordance with an embodiment, selecting a particular media option, for example a particular media tile or thumbnail, can be used as a request or instruction by a user and/or the client device, to the media server, to download, stream or otherwise return a corresponding particular media item or stream of media content.

For example, the user interface at the client device can be adapted to display a plurality of thumbnails which correspond to media streams or channels of music or videos (e.g., television shows, or movies) that are stored as media items in a database or repository at the media server, or are being streamed or otherwise provided by another media content source via the media server.

In accordance with an embodiment, the client device can include a media application 108, together with a media content buffer 110, and a data buffering logic 112, which can be used to control the playing of media content received from the media server, for playing either at the requesting client device or at a controlled client device (controlled device).

In accordance with an embodiment, the data buffering logic, together with the media content buffer, enables a portion of media items, or samples or snippets thereof, to be pre-buffered at the client device. While media options are being prepared for display on the user interface as, e.g., media tiles or thumbnails, their related media content can be pre-buffered at the same time.

For example, in accordance with an embodiment, media content or data sent from (or streamed from) a media server can be cached by a client device in its media content buffer within the memory of the client device, for prompt and efficient playback when required.

Media Server System

As further shown in FIG. 1, in accordance with an embodiment, the media server can include an operating system 146 or other processing environment which supports execution of a media server application 150 that can be used, for example, to stream music, video, or other forms of media content to a client device, or to a controlled device.

In accordance with an embodiment, the media server can be operated according to and/or can provide a subscription-based media streaming service, for which a client device or user can have an associated account and credentials, and which enable the user's client device(s) to communicate with and receive content from the media server.

In accordance with an embodiment, a received media control request from a client device can include information (e.g., a network address) identifying a destination client device, to which the media server should stream or otherwise provide media content, in response to processing the media control request.

For example, a user may possess multiple client devices which can present media content received from a media server, such as a smartphone and a television. In accordance with an embodiment, the identifying information provided with a media control request can include a network or other identifier, such as an IP address, MAC address, or device name, which identifies that the media control request is intended for use with a particular destination device. This allows a user to, for example, use their smartphone as a controlling client device, and use their television as a controlled client device to which media content should be sent, for example to change channels. The media server can then send the requested media and/or forward the media control request to the television, even though the request originated at the smartphone.

In accordance with an embodiment, a media application interface 148 can receive requests from client devices, or from other systems, to retrieve media content from the media server.

In accordance with an embodiment, media content, including media items and/or samples associated therewith, can be provided, for example, within one or more media content databases or repositories, or can be received at the media server from another source.

In accordance with an embodiment, a context database 162 can store data associated with the presentation of media content by a client device, including, for example, a current position within a media stream that is being presented by the client device, or a playlist associated with the media stream, or one or more previously-indicated user playback preferences. The media server can transmit context information associated with a media stream to a client device that is presenting a particular content stream, so that the context information can be used by the client device, and/or displayed to the user.

For example, in accordance with an embodiment, when the destination client device to which the media content is being streamed changes, for example, from a controlling device to a controlled device, or from a first controlled device to a second controlled device, then the media server system can transmit context information associated with an active media content to the newly-appointed destination device, for use by that device in playing the media content.

In accordance with an embodiment, a media content database 164 can include media content, for example music, songs, videos, television shows, or movies, together with metadata describing the media content. The metadata can be used to enable users and client devices to search through repositories of media content, to identify and access particular media items.

In accordance with an embodiment, if the media content database also includes commercial (advertisement) media, then those commercials can similarly include metadata describing their content. In accordance with an embodiment, commercial (advertisement) media can also be stored at or provided from other sources.

As described in further detail below, in accordance with an embodiment, a media analysis logic 170 can be used, together with a media analysis model, to provide commercial detection in television and other media environments, including providing information as to the location of commercials within a media stream. The information can be subsequently used in controlling the display or playback of the media stream.

In accordance with an embodiment, a buffering logic 180 can be used to retrieve or otherwise access media items or content, in response to requests from client devices or from other systems, and to populate a media content buffer 181, at a media delivery module 152, with streams 182, 184, 186 of corresponding media content data, which can then be returned to the requesting device or to a controlled device.

In accordance with an embodiment, a plurality of client devices, media server systems, and/or controlled devices, can communicate with one another using a network, for example the Internet 190, a local area network, peer-to-peer connection, wireless or cellular network, or other form of network.

In accordance with an embodiment, the system can be used to stream or otherwise communicate music, video, or other types of media content, wherein the client user interface can display a menu of media options 191, which correspond to a music, video or other media content stored at the media server system, or to media channels, video, or other types of media streams that can be streamed by the media server to client devices.

User Interaction with Media Environment

In accordance with an embodiment, a user 192 can interact 194 with the user interface at a client device, and issue requests to access media content, for example the playing of a selected music or video item at their own client device or at a controlled device, or the streaming of a media channel or video stream to their client device or to a controlled device.

For example, as shown in FIG. 1, in accordance with an embodiment, the user's selection of a particular media option can be communicated 196 to the media server, via the server's media application interface.

In accordance with an embodiment, the media server can populate its media content buffer at the server 204, with corresponding media content, 206 including one or more streams of media content data. The media server can then communicate 208 the selected media content, such as a song, video, media channel, video stream, or other item of media content, to the user's client device, or to the controlled device as appropriate, where it can be buffered in a media content buffer for playing at the destination device.

In accordance with an embodiment, at the client device, or at a controlled device, in response to the user's interaction with the user interface, the media application can play the requested media content to the user, for example by playing one or more music or videos, media channels or video streams at the client device or controlled device, as appropriate.

For example, as described above, in accordance with an embodiment, media options can be provided on the application user interface as a visual array of media options, for example as a two-dimensional array of media tiles or thumbnails. In accordance with an embodiment, each media tile or thumbnail can be associated with a particular visualization, for example a media channel icon, or a buffered portion of its corresponding media content.

In accordance with an embodiment, a selected point or region can be moved within the array of media options, to select media contents for playing. For example, in accordance with an embodiment, the user interface can be provided as or include a touch-sensitive user interface, which recognizes input in the form of touch, for example the position of a user's finger or a stylus upon the user interface, to determine the selected point or region within the visual array of media options. Similarly, the user interface can determine the selected point or region as it is being moved, in response to a user input, within the visual array of media options. The system can, upon receiving the user input, initialize playing of those media options associated with the selected point or region, or in the case of switching between multiple media channels or streams of media, issue a media-change request to change or select a different media channel for playing.

Remote Control of Controlled Devices

Figure 2:
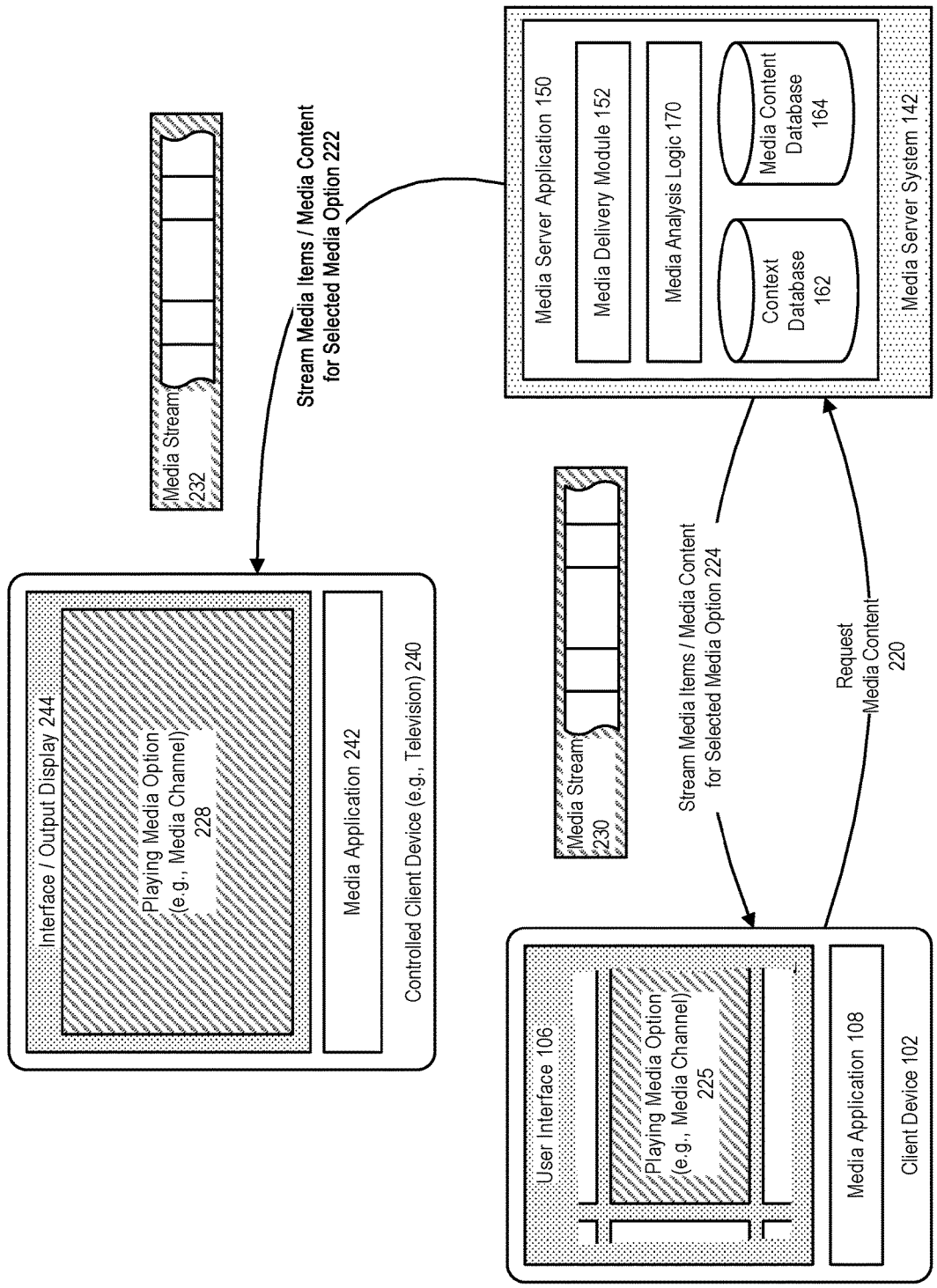
FIG. 2 further illustrates a system for providing commercial detection, in accordance with an embodiment.

FIG. 2 further illustrates a system for providing commercial detection, in accordance with an embodiment.

As shown in FIG. 2, in accordance with an embodiment, a client device having an application user interface can act as a controlling client device, for example a remote control, to control playing of media content at a controlled device 240 having an output display or viewing interface 244, for example a suitably-equipped television.

In accordance with an embodiment, the controlled device can also include a media application 242, which in the case of a television or similar device can be included within the television, or within a separate set-top box or similar device for use with the television.

As described above, in accordance with an embodiment, a user can interact with the application user interface at the controlling client device and issue requests to access media content, for example the playing of a selected music or video item at their own client device, or at a controlled device, or the streaming of a media channel or video stream to their client device or the controlled device.

For example, as shown in FIG. 2, in accordance with an embodiment, a user can request 220 that media content be buffered, streamed or received 224 and played 225 at the controlling client device, and simultaneously buffered, streamed or received 222 for playing 228 at the controlled device. In accordance with an embodiment, media can be provided to the controlling device or controlled devices as media streams 230, 232.

In accordance with an embodiment, the media server can buffer media content associated with a restricted number of the media options displayed on the user interface, including the currently selected or playing media option. For example, the media server can be triggered to buffer media content associated with a currently playing media option, and also one or more neighboring media options as displayed on the user interface, either at the controlling device and/or the controlled device, in preparation for selection by the user.

While the user interacts with the client device, for example by panning available options, the user can select other media options for previewing of its associated media content. User interactions, such as media control or media-change requests can be communicated to the media server.

For example, in accordance with an embodiment, the user can issue a media-change request to change a media channel, in response to which the media server can switch the media channel at the controlled device (e.g., television), and thereafter continue to buffer media contents for the switched channel, at the controlled device. Since a portion of the media content has already been buffered, the switching to the channel at the controlled device can operate in a generally seamless manner, with minimal disruption in the video stream selected.

Determination of Content and Commercial Blocks

In accordance with an embodiment, a media stream, for example, a video stream of television shows or movies, can be analyzed either in advance or in realtime, to determine commercial segments or blocks within the media stream, and to distinguish them from (non-commercial) content segments or blocks.

For example, a media stream that includes television shows, such as a streamed television media channel, may include a series of shows interspersed with various commercials or advertisements.

In some instances, commercials may be displayed periodically during the running of a particular television show, which is common for broadcast-type media channels. In other instances, commercials may be displayed at the completion of a television show, prior to the beginning of the next television show, which is more common for premium or paid media channels. The positioning and frequency of commercials relative to non-commercial content is generally determined by the producer of the media stream or channel. Different countries or regions may also have different requirements as to how commercials should be identified or displayed. For example, some countries or regions may require the use of cue points or other notification mechanisms to indicate the beginning of a television show or a sequence of commercials.

In accordance with an embodiment, each segment of an overall media stream can be considered to comprise either non-commercial blocks (generally referred to herein as content blocks), or commercial (advertisement) blocks.

As described herein, such characterization is useful for differentiating between non-commercial and commercial media segments of a media stream, and supporting various use cases that benefit from such differentiation. In accordance with other embodiments, other types of blocks can be used to differentiate between different types of non-commercial/content blocks within a media stream, or between different types of commercial/advertisement blocks within a media stream.

For example, a length of media stream spanning a 30-minute television show which includes commercials may comprise several commercial and non-commercial segments, while each segment in turn may include one or more commercial or non-commercial blocks.

Figure 3:
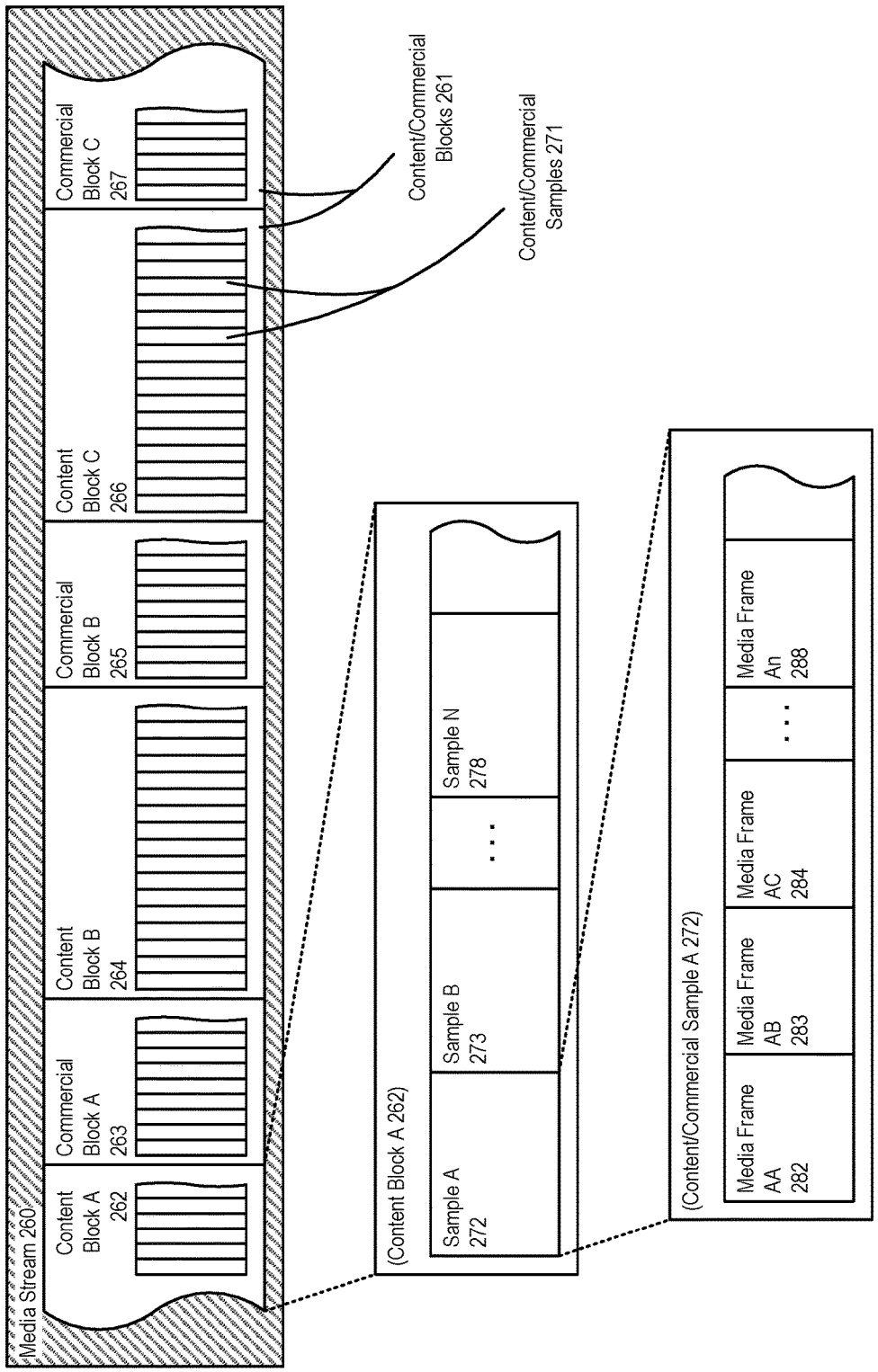
FIG. 3 illustrates the determination of content and commercial blocks in a media stream, in accordance with an embodiment.

FIG. 3 illustrates the determination of content and commercial blocks in a media stream, in accordance with an embodiment.

As shown in FIG. 3, a typical media stream 260 can comprise a plurality of content/commercial segments or blocks 261, including a series of content blocks, for example content blocks A 262, B 264 and C 266, interspersed with a series of commercial blocks, for example commercial blocks A 263, B 265 and C 267.

In accordance with an embodiment, the media stream, together with the content blocks therein can be sampled as a plurality of content/commercial samples 271, each having a particular length, for example a 5 second sample of media content.

For example, as illustrated in FIG. 3, content block A 262 can be sampled as a plurality of content/commercial samples, including samples A 272, B 273 through N 278.

In accordance with an embodiment, each of the content/commercial samples includes a plurality of media frames that can be analyzed by the media analysis logic and/or displayed to a user. For example, as illustrated in FIG. 3, sample A of content block A can include content media frames AA 282, AB 283, AC 284 through An 288.

Figure 4:
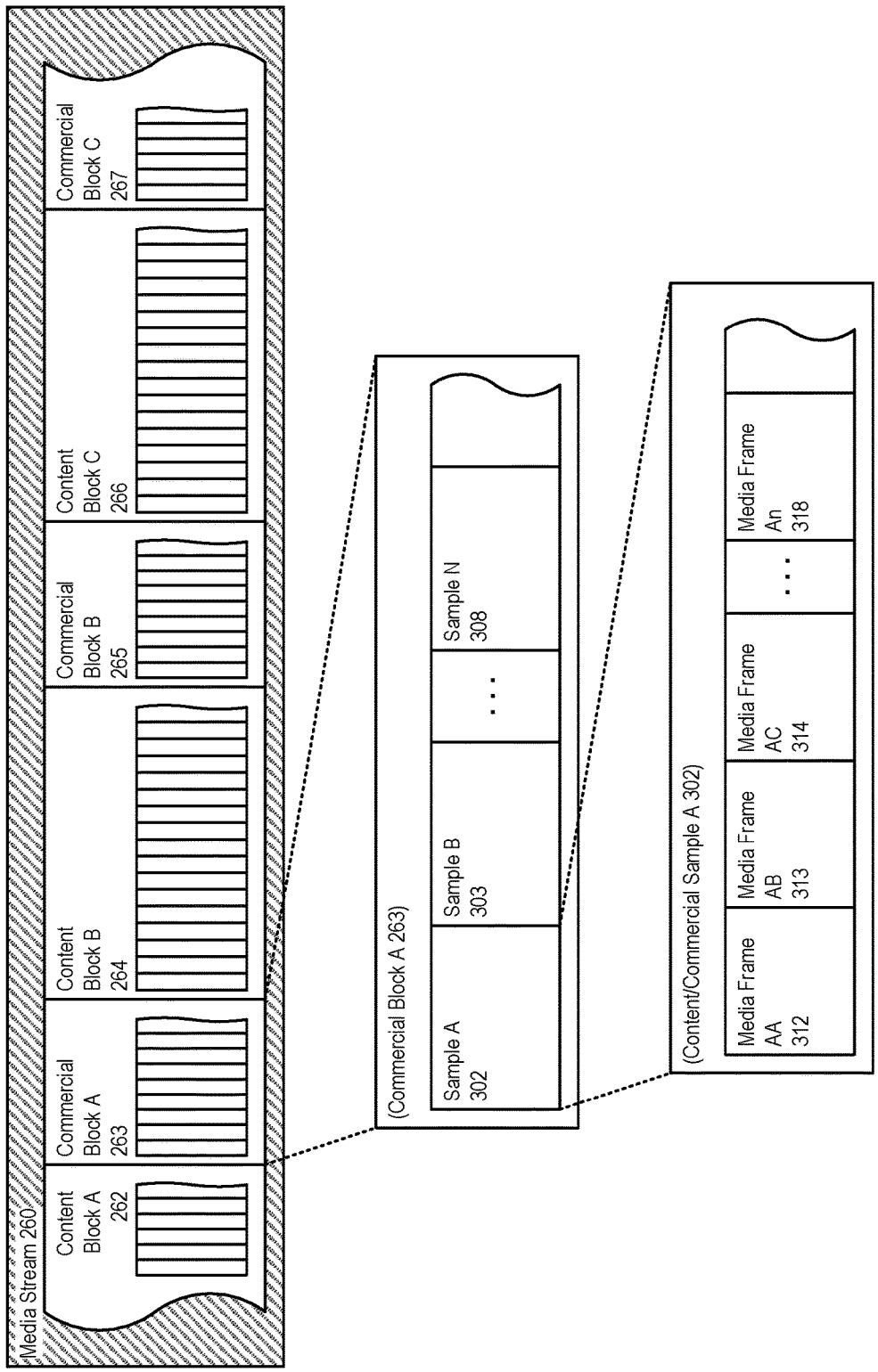
FIG. 4 further illustrates the determination of content and commercial blocks, in accordance with an embodiment.

FIG. 4 further illustrates the determination of content and commercial blocks in a media stream, in accordance with an embodiment. As described above, a media stream, together with the content and commercial blocks therein can be sampled as a plurality of, for example, 5 second long content/commercial samples.

As shown in FIG. 4, in accordance with an embodiment, commercial block A can be similarly sampled as a plurality of content/commercial samples, including in this example samples A 302, B 303 through N 308.

Similarly, each of the content/commercial samples can include a plurality of commercial media frames, for example, commercial media frames AA 312, AB 313, AC 314 through An 318.

Figure 5:
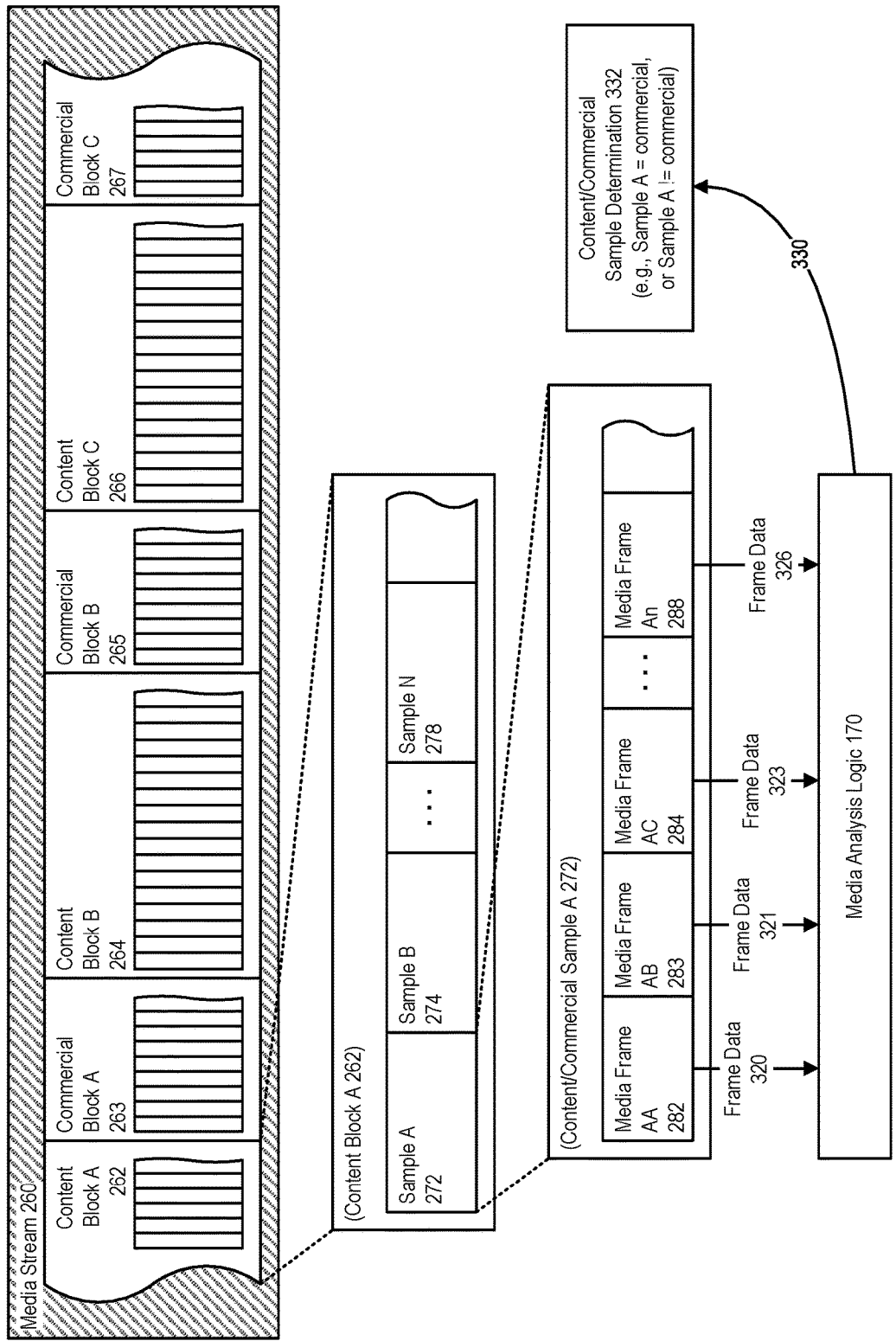
FIG. 5 further illustrates the determination of content and commercial blocks, in accordance with an embodiment.

FIG. 5 further illustrates the determination of content and commercial blocks in a media stream, in accordance with an embodiment.

As shown in FIG. 5, in accordance with an embodiment, frame data 320, 321, 323 through 326 can be captured from each of a plurality of content media frames AA, AB, AC through An, and provided to a media analysis logic. Frame data can be similarly captured from a plurality of commercial media frames and provided to the media analysis logic. The frame data can be used by the media analysis logic to determine whether a particular media frame comprises a commercial (advertisement) frame, or alternatively comprises a non-commercial content frame, and to provide such determination 332 for subsequent use.

In accordance with an embodiment, the cumulative frame data for all media frames within a particular content/commercial sample can also be used by the media analysis logic, to determine 330 whether a particular sample is either a commercial sample, or alternatively a non-commercial media sample, and to provide such determination 332 for subsequent use.

Figure 6:
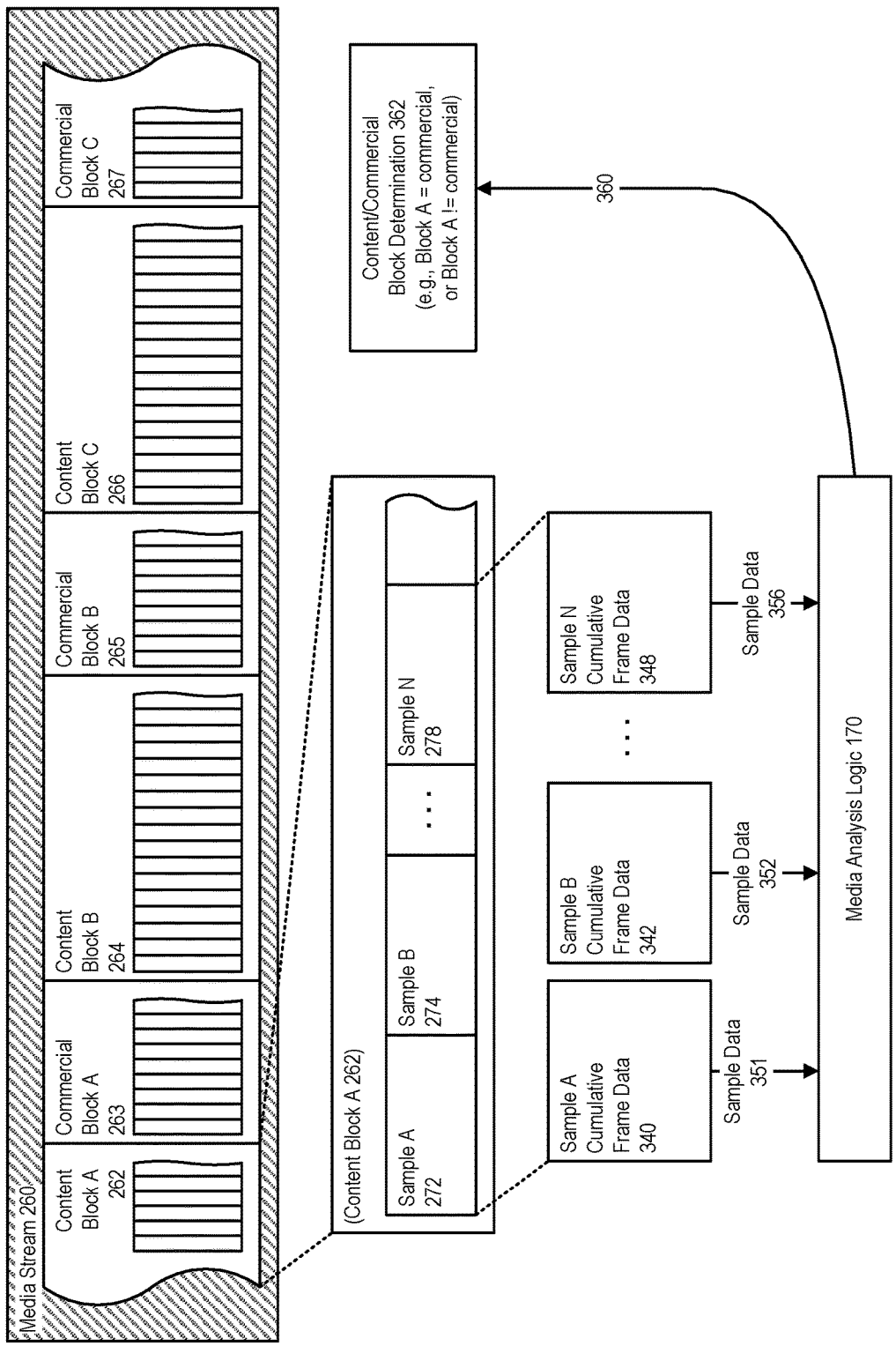
FIG. 6 further illustrates the determination of content and commercial blocks, in accordance with an embodiment.

FIG. 6 further illustrates the determination of content and commercial blocks in a media stream, in accordance with an embodiment.

As shown in FIG. 6, in accordance with an embodiment, the cumulative frame data for all of the samples within a particular content/commercial block, for example sample A's cumulative frame data 340, sample B's cumulative frame data 342, and sample N's cumulative frame data 348, can be used 351, 352, 356 by the media analysis logic, to determine 360 that the respective content/commercial block is either a commercial block, or alternatively a non-commercial content block, and to provide such determination 362 for subsequent use.

In the examples illustrated in FIGS. 5 and 6, the analysis of media frames is illustrated as being used to ascertain content/commercial samples, and ultimately determine, based on those samples, a content block within a media stream. A similar approach can be used to ascertain content/commercial samples, and ultimately determine a commercial block within the media stream. The process can be similarly repeated to determine, either in advance or in realtime, a plurality of commercial segments or blocks within the media stream, and to distinguish them from a plurality of non-commercial content segments or blocks.

Black Spaces and Cue Points

As described above, within a media stream or channel of, e.g., television shows, or movies, the positioning and frequency of commercials relative to non-commercial content is generally determined by the producer of the media stream or channel. Different countries or regions may also have different requirements as to how commercials should be identified or displayed, including requiring the use of cue points or other notification mechanisms to indicate the beginning of a television show or sequence of commercials.

For example, in the U.S., brief periods of no video or sound (generally referred to herein as black spaces) may be included within a television stream or a streamed media channel to indicate the beginning of, or to cue, a television show or a commercial; whereas in Sweden such black spaces may not be used, and instead a television show may transition immediately to a commercial, and vice versa.

Figure 7:
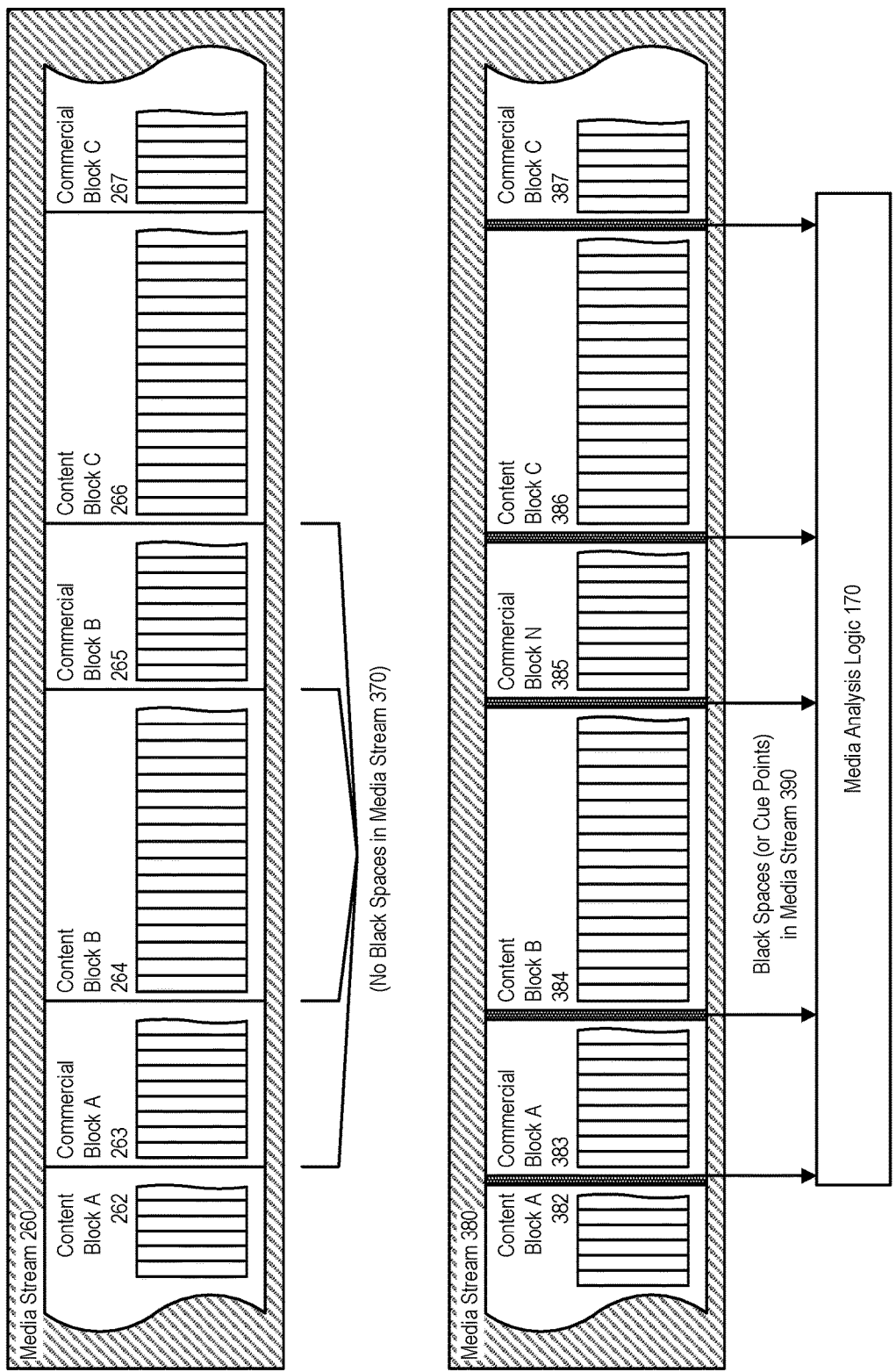
FIG. 7 illustrates a media stream which includes the use of black spaces or cue points, in accordance with an embodiment.

FIG. 7 illustrates a media stream which includes the use of black spaces or cue points, in accordance with an embodiment.

As shown in FIG. 7, in accordance with an embodiment, a media stream can be produced as described above, with no black spaces (370) within the media stream between, for example, the ending of a content block and the beginning of a commercial block, or between the ending of a commercial block and the beginning of a content block.

In accordance with other embodiments, a media stream 380 can be produced which does include black spaces 390, or other cue points, within the media stream, between, for example, the ending of content block A 382 and the beginning of commercial block A 383, or between the ending of commercial block B and the beginning of next content block B 384; or between other content and commercial blocks 385, 386, 387.

In accordance with an embodiment, for streams in which black spaces, or other cue points are used, the media analysis logic can consider additional characteristics determinative of media or commercial blocks-for example, the length of time between two black spaces, the characteristics of on-screen actions before or after a particular black space, or the characteristics of actions during the interval between two black spaces.

Media Analysis Logic and Analysis of Frame Data

As described above, in accordance with an embodiment, media frame data can be captured from each of a plurality of content media frames, or commercial media frames, and provided to the media analysis logic, where it can be used to determine whether a particular frame comprises a commercial (advertisement) media frame, or alternatively comprises a non-commercial content media frame.

In accordance with an embodiment, frame features, black spaces, cue points, or other segment or block information, can be used to improve the accuracy and precision with which media streams are analyzed and commercials are identified.

Figure 8:
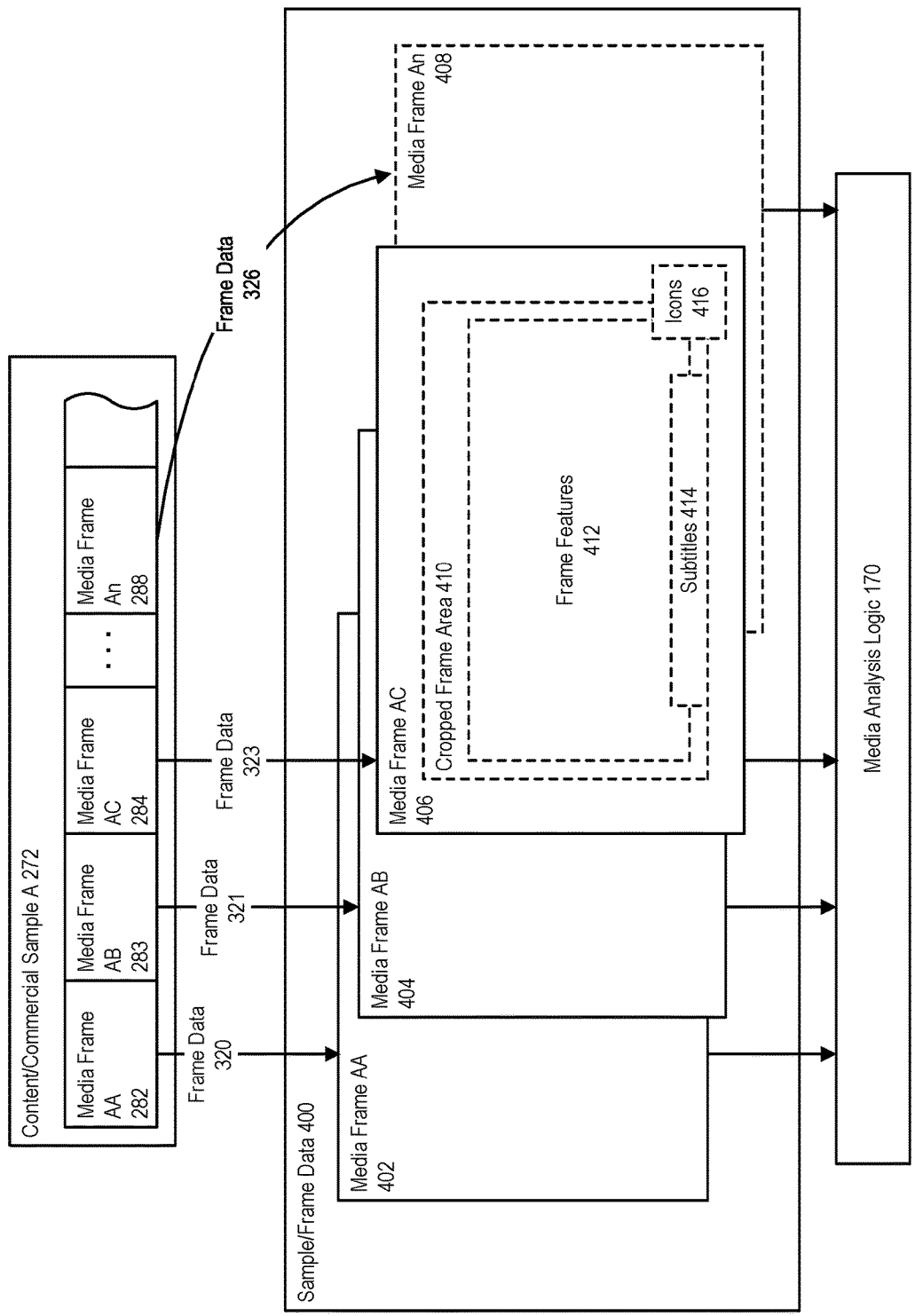
FIG. 8 illustrates the analysis of frames in a media stream, in accordance with an embodiment.

FIG. 8 illustrates the analysis of frames in a media stream, in accordance with an embodiment.

As shown in FIG. 8, in accordance with an embodiment, the media analysis logic is adapted to analyze characteristics of the media frame data 400, for example the data corresponding to media frames AA 402, AB 404, AC 406 through An 408.

In accordance with an embodiment, the media frames can be cropped to provide a cropped frame area 410, which reduces the amount of computational processing subsequently required to analyze each frame, while retaining the characteristics necessary to perform an accurate analysis.

Examples of the frame features 412 that can be analyzed include whether the media frame is black (e.g., within a black space of the media stream), or includes the presence of subtitles 414, or channel icons 416.

Other examples of features that can be considered by the media analysis logic, when considering a sample as a whole (e.g., an entire 5 second sample), include the number of scene changes or different shots within the sample, the presence of on-screen text, the time since last black space, or the video luminosity, each of which may be indicative of whether a particular frame, sample, or block is likely to comprise a commercial (advertisement) frame, or alternatively a (non-commercial) media frame.

These and additional frame and sample features that can be considered by the media analysis logic are described in further detail below.

Black spaces: in accordance with an embodiment, the media analysis logic can determine when a media content, for example a television program, fades or directly jumps to a black (or blank of another color) frame. Black spaces can be generally considered as a set of constantly black or blank frames, which optionally may be preceded by a fade to black, and which endure for a measurable period of time, e.g., 100-500 milliseconds. In accordance with an embodiment, the determination of black can be assessed by measuring the average luminosity of the frames below a particular threshold, and can include allowances to accommodate stray non-black pixels. In accordance with an embodiment, the determination of black/blank frames can be combined with other characteristics, such as black/blank frames of specific duration, black/blank frames with silent audio separated by lengths of 15*n seconds (a common unit of measurement for commercials), the amount of scene changes before or after black/blank frames, or the recognition of music or comparative audio levels.

Audio silence: in accordance with an embodiment, the media analysis logic can determine the presence of audio silence for a brief period of time, e.g., 50-500 milliseconds, which in some environments is indicative that a commercial is about to appear following a television program segment.

Black spaces with audio silence: in accordance with an embodiment, the media analysis logic can determine a combination or overlap of black/blank frames and audio silence, which in some environments is a strong indicator of a commercial block start/end and/or an individual commercial start/end.

Scene changes: in accordance with an embodiment, the media analysis logic can determine that a large amount of the picture has changed before or after black/blank frames, for example by measuring a color histogram for the media frame, including identifying large changes above a specific threshold.

Frequency of scene changes: in accordance with an embodiment, the media analysis logic can determine that a large amount of the picture has changed, together with the frequency with which this occurs. For example, some commercials may have a scene change frequency of up to 20-30 cuts per minute, while a typical television show or movie may have 3-5 scene change cuts per minute. Scene change detection using histogram changes may be further complemented with detection of, for example, high-motion vector lengths and/or large numbers of edge pixels.

Fade in/out scene transitions: in accordance with an embodiment, scene fade in/out can be determined by detecting monochrome frames, and gradual transitions from monochrome with progressively increasing or decreasing intensity, within a specific number of (e.g., 5-10) frames.

Absence of long term logo detection: in accordance with an embodiment, the media analysis logic can assess a part of the picture that does not change during a longer portion of a recorded show, for example an onscreen television channel logo which remains on-screen for more than, e.g., 90 seconds. This characteristic can be then used to detect segments where logos are usually removed, for example during commercial breaks. Similar to the detection of scene changes described above, this feature can be determined using histogram differentials on picture regions, for example by analyzing frames as, e.g., several 32×32 pixel regions, and determining those regions which change infrequently, for which there is a reasonable probability that the region includes a logo.

Subtitles: in accordance with an embodiment, the presence of more on-screen text may indicate commercials in some countries or regions; whereas in other countries or regions, the presence of more on-screen text may indicate non-commercial content.

Absence of closed-caption text: in accordance with an embodiment, in some instances, the use of closed-caption text may cease during a commercial break between television shows.

Audio volume level increase relative to adjacent content: in accordance with an embodiment, the audio level for commercials is frequently, but not always, louder than the audio level of surrounding video content.

Text detection: in accordance with an embodiment, many commercials include an on-screen text describing a product name or product information, and this text may be rapidly changing on screen and fit within a 15*n second segment, compared with the larger and more slowly changing channel logos that often accompany non-commercial content.

Audio recognition: in accordance with an embodiment, the detection of music within a 15*n second segment, surrounded or bracketed by blank frames and/or adjacent music segments, and optionally surrounded before and afterwards with additional audio recognition of music within similar sized video segments, can be indicative of a commercial.

Facial recognition: in accordance with an embodiment, recognition of faces in the video stream can be a useful cue in order to identify or distinguish between commercials and program segments, since certain patterns of how people appear in different types of commercial or non-commercial content may be useful as a feature assisting classification. For example, in a commercial advertisement, the actors may have more prominent smiles, or may spend more time looking directly at the camera, when compared to actors in a non-commercial content.

Aspect ratio: in accordance with an embodiment, aspect ratio changes can occur at commercial boundaries. For example, an HDTV television program may transition to a 4:3 commercial, or a 4:3 commercial may transition to a 16:9 HD format television commercial.

Video commercial blocks: in accordance with an embodiment, video commercials are often structured as sets of 3-10 commercials in a row of 15*n seconds each, usually up to 90 seconds, and the media analysis logic can look for patterns of this type.

Correlation of average temporal position of commercial blocks relative to program start: in accordance with an embodiment, video commercials may occur in program material in a typical pattern of temporal positions (for example, for a particular set of media channels, commercials are known to generally occur at time position 8 to 10 minutes, 16 to 19 minutes, and 24 to 27 minutes within a program's running time). By determining the average temporal positions of commercials relative to program start for a large number of commercials, the media analysis logic can determine likely temporal positions for commercials.

Correlation with in-band commercial signals: in accordance with an embodiment, for feeds provided by broadcasters, the MPEG2 transport stream may include SCTE (Society of Cable Telecommunications Engineers) standard or other in-band signals which mark the start and end of a single commercial within a block of commercials, or for the starting or ending commercial within a block of commercials (such spots are considered the highest value commercials since they may be seen, in whole or in part, even when ad-skipping is used).

Compressed domain feature detection: in accordance with an embodiment, if features are detectable in the compressed media domain (e.g., directly in H.264), then performance can be improved for identifying features.

Audio and/or video fingerprint/signature identification: in accordance with an embodiment, audio fingerprinting can be used to generate an audio fingerprint for specific timed segments of the video stream, and compare the audio fingerprint to a large database of known audio fingerprints of television commercials. Video fingerprinting can be similarly used to generate a video fingerprint for specific timed segments of the video stream, and compare the video fingerprint to a large database of known video fingerprints of television commercials. Combined audio and video fingerprinting can be used to combine the methods above in order to ensure a more precise match for identifying commercial content. Such features are useful both in commercial detection, and commercial identification. For example, in accordance with an embodiment, particular commercials (e.g., commercials for a particular brand of product) can be identified, together with information as to the location of those commercials within the media stream.

Multimodal Analysis

In accordance with an embodiment, each of the features found in the media stream can be weighted by relative importance, and the components summed, to form a prediction of the overall likelihood that a particular segment or block is commercial, or non-commercial, content.

For example, in accordance with an embodiment, a multimodal analysis can utilize information regarding black/blank frames, scene changes, music recognition, and/or logo detection, and other detectable information. The multimodal analysis can group frames into sample groups separated by blank frames, and rate each sample group based upon factors such as the rate of scene change, the percentage of frames in the group with logo present, or the length of the block. Indications that a sample group is part of a commercial (such as very high rates of scene changes) may raise the group's (and hence the block it is within) score, while indications that a sample group is part of, e.g., a television show, such as having a logo present on most frames, may lower the group/block's score.

In accordance with an embodiment, the more features that are analyzed, the more accurate the prediction. For example, in accordance with an embodiment, the media analysis logic can utilize a hidden Markov media analysis model, which enables the prediction of classifiers using training sets with thousands of videos and commercials. Each additional feature included within the media analysis model improves the precision of the system for subsequent classification. Media streams intended as training sets may be manually marked with classifications for purposes of machine learning. Training and testing sets can be different, since a diverse mix of content assists in continuing to improve the precision of the model.

In accordance with an embodiment, a linear classifier can be used, whereby a feature's characteristics or its feature vectors are combined/weighted via a linear combination, in order to make an accurate classification (e.g., the presence of a commercial or content segment).

For example, using several of the above features as an example, a simple media analysis model can be represented as:

$F1$=an indication of how long ago since black frames.
$F2$=an indication as to the presence of audio silence.
$F3$=an indication as to the scene cut frequency.

wherein the determination of whether a particular sample or block is commercial/non-commercial can be represented as a combination of vectors, for example, at a point in time 1, the combination of vectors may be:

[$F1$ (1) $F2$ (1) $F3$ (1)]=0

While, at a later point in time n, the combination of vectors may be:

[$F1$ (n) $F2$ (n) $F3$ (n)]=1 which can be used as part of a linear regression model, for example, to predict that, at a particular point in time n+1, the combination of vectors, and hence the likelihood that the block at n+1 will be commercial or non-commercial is:

[$F1$ (n+1) $F2$ (n+1) $F3$ (n+1)]=(0 or 1, depending on the model)

The above is provided by way of illustration. In accordance with other embodiments, other models, features, and classifiers can be used.

Training and Usage

In accordance with an embodiment, before the system can be used in a production environment, it must be trained with a media stream in which the various segments of commercial and non-commercial media content are known, so that appropriate features and classifiers can be determined.

Figure 9:
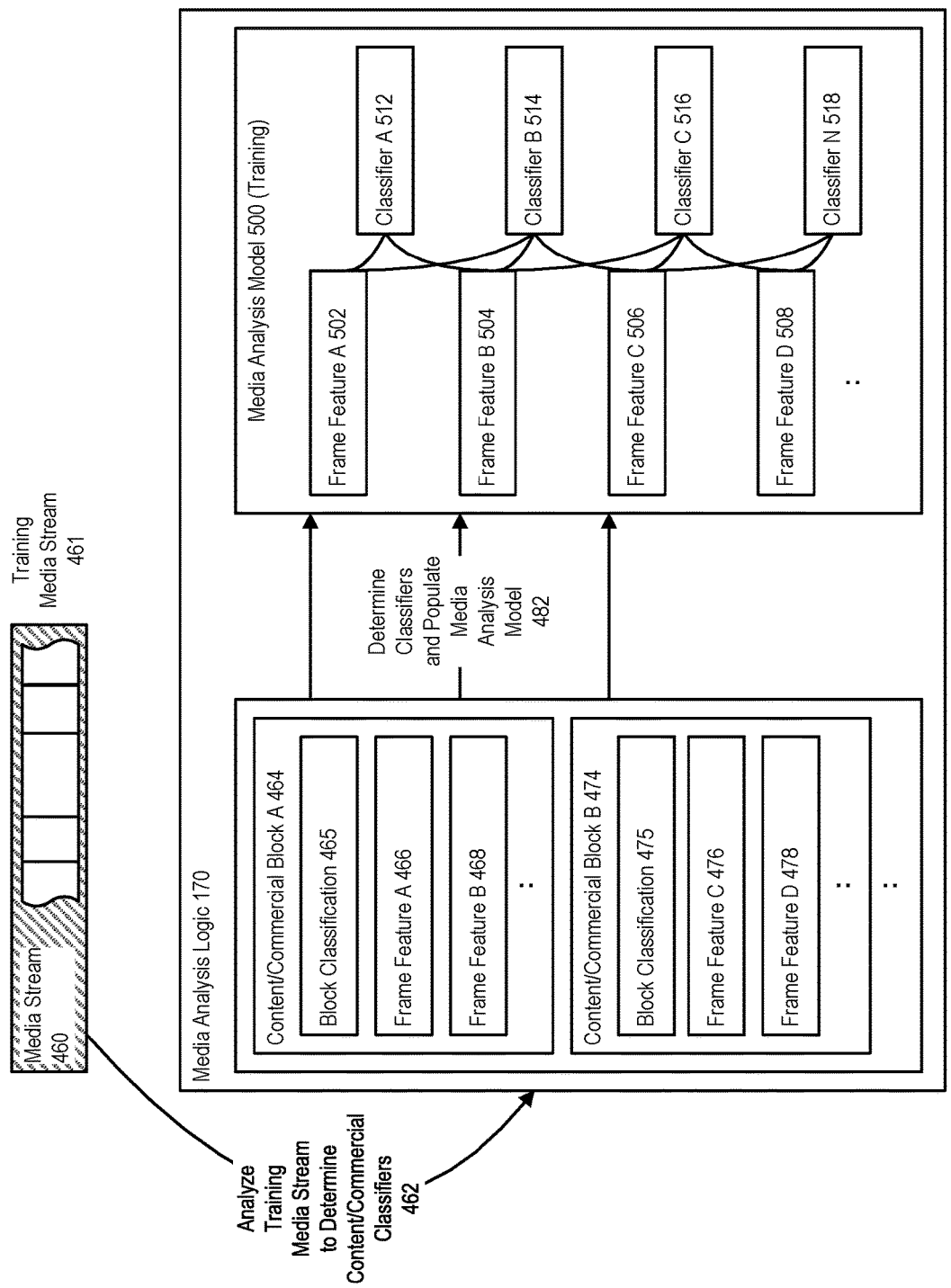
FIG. 9 illustrates how the system can be used to provide commercial detection during media streaming, in accordance with an embodiment.

FIG. 9 illustrates how the system can be used to provide commercial detection during media streaming, in accordance with an embodiment.

As shown in FIG. 9, in accordance with an embodiment, a media stream 460, adapted for use as a training media stream 461, can include content/commercial blocks of known classification, and can be analyzed 462 by the media analysis logic, to determine, within each content/commercial block 464, 474, the block's classification 465, 475, and one or more media frame features 466, 468, 476, 478 that are reflective of the block's known classification as commercial or non-commercial content.

In accordance with an embodiment, the media analysis logic can use this information to create or populate 482 a media analysis model 500 which associates media frame features 502, 504, 506, 508 with classifiers 512, 514, 516, 518. The media analysis model can then be used with a production media stream, either in advance or in realtime, to determine commercial segments or blocks within the production media stream.

In accordance with an embodiment, the training analysis can be written to a file, including a section for each, e.g., 5 second sample. A user can then label the sections within the file with known block classifications, which can be used by the system to determine which features correlate to the output.

For example, in accordance with an embodiment, a 14 hour-long training media stream can be used to produce approximately 10000 samples for training, which can then be classified and used to populate and refine the model.

In accordance with an embodiment, a single training media stream or sample set can be re-used on new versions of the system or media analysis logic. Different training media streams can also be developed for different country or regional requirements, and can be used to train the system to handle streams produced according to that standard. For example, U.S. and Swedish training media streams can be used to train a system to understand both regional streaming patterns.

In accordance with an embodiment, classifiers can be configured, for example, by country of origin, region, or channel type. The system can also recognize different classifiers for use with different types of media channel, for example sports, or live channels.

Figure 10:
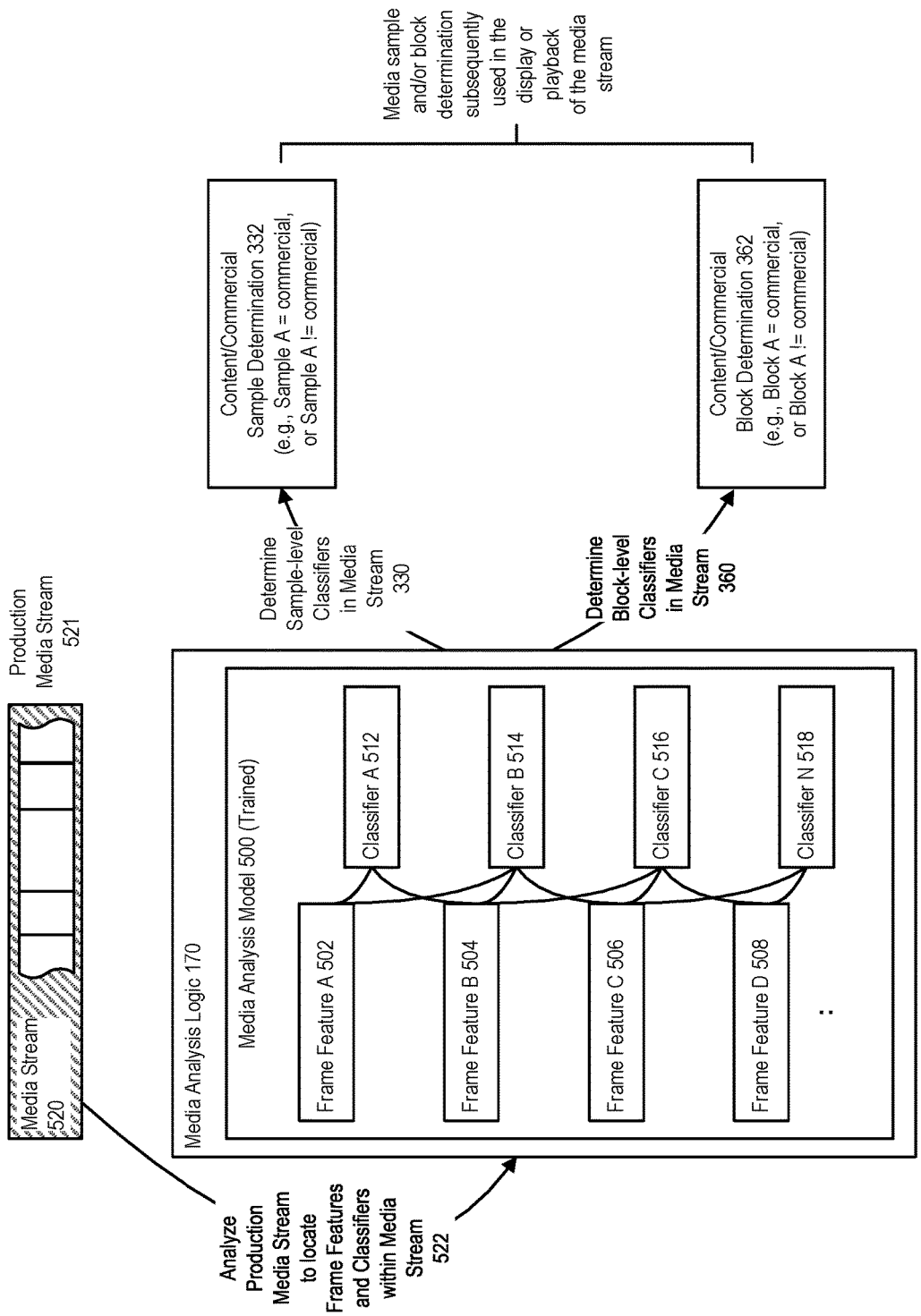
FIG. 10 further illustrates how the system can be used to provide commercial detection during media streaming, in accordance with an embodiment.

FIG. 10 further illustrates how the system can be used to provide commercial detection during media streaming, in accordance with an embodiment.

As shown in FIG. 10, in accordance with an embodiment, a media stream 520, received as a production media stream 521, can include content/commercial blocks of unknown classification, and can be analyzed 522 by the media analysis logic, to locate frame features and classifiers within the media stream, and, based on this, determine whether a particular sample is either a commercial sample, or alternatively a non-commercial media sample; or determine that the respective content/commercial block is either a commercial block, or alternatively a non-commercial content block, and to provide such determination for subsequent use.

In accordance with a embodiment, following training, the system can read new data, e.g., from MPEG2 transport streams, generate samples of predictors, and send those to a database for subsequent use. Information already stored in the database can be used to smooth out a large block of media in terms of whether there are/were commercials in that block. The system can continue to sample the media stream even if it is known, for example, that the last sample was a commercial within a commercial block, since the additional information stored in the database can be used to further improve the prediction of the current or a next commercial block.

In accordance with an embodiment, the result of tests on a media stream are scalar values, for example the rate of screen shots per second, which can be provided to the media analysis and weighted if necessary.

In accordance with an embodiment, the media analysis logic generally uses a fixed length interval for sampling. In other embodiments, for example when sampling a movie likely to have little or no commercial breaks, it may be desirable to sample at lesser frequency. In accordance with an embodiment, the system can use different classes sampling intervals as commercial/advertisement, not commercial/advertisement, or mixed, and act appropriately.

Cloud and Networked Environments

In accordance with an embodiment, media streams can be used within an on-demand cloud-based media environment, which allows a user to select within a plurality of media channels, and to view or skip particular commercials.

Figure 11:
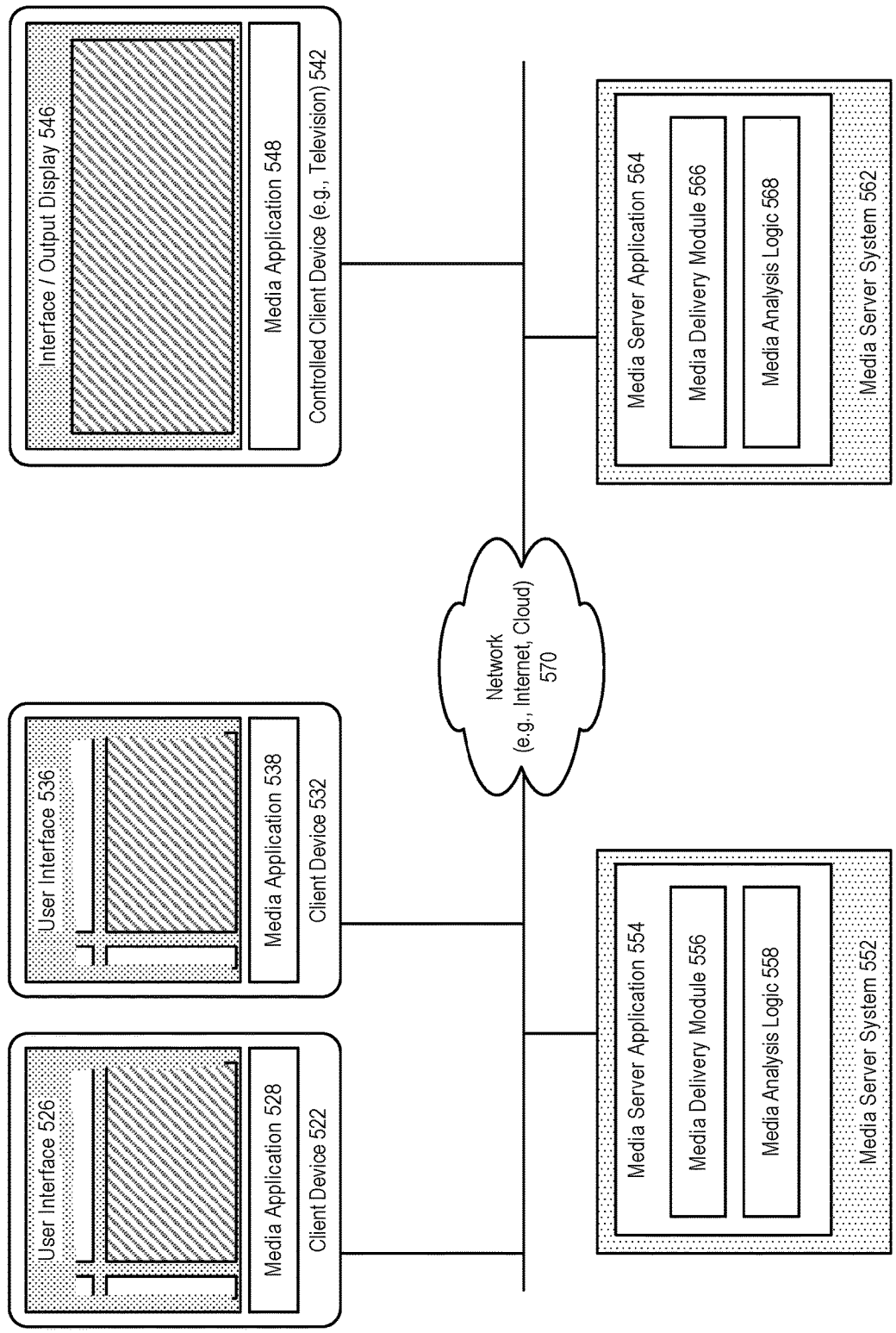
FIG. 11 illustrates how commercial detection can be used in a cloud or networked environment, including streaming of media to client devices, in accordance with an embodiment.

FIG. 11 illustrates how commercial detection can be used in a cloud or networked environment, including streaming of media to client devices, in accordance with an embodiment.

For example, in accordance with an embodiment, the system can be used to provide a cloud-based digital video recorder (DVR) environment, including presenting large amounts of time-shifted video content to users, and providing them with the ability to switch between different time shifted-programs in an immersive, seamless, and commercial-free or personalized environment.

As shown in FIG. 11, in accordance with an embodiment, each of a plurality of media servers 552, 562, having a media server application 554, 564, media delivery module 556, 566, and media analysis logic 558, 568, can support the simultaneous use of multiple client devices 522, 532, or controlled devices 542.

In accordance with an embodiment, the plurality of client devices, media server systems, and/or controlled devices, can communicate with one another using a network 570, for example the Internet or another form of network communication as described above. In accordance with an embodiment, each client device or controlled device can include a media application 528, 538, 548 and a user interface or output display 526, 536, 546, which together can be used to control the playing of media content received from the media server system, for playing either at the client device, or at a controlled device.

In accordance with an embodiment, both a controlling client device and a controlled device can be associated with a common user account, or with several associated user accounts provided by a content provider, with which a media server system is associated.

For example, in accordance with an embodiment, the controlling client device can be provided as a personal computer or a set-top box optionally associated with account credentials, which receives content from the media server system; while the controlled device can be a media presentation device, for example a set of speakers or a television, which receives the content either from the client device and/or from the media server system, and plays or otherwise presents that content to the user.

Figure 12:
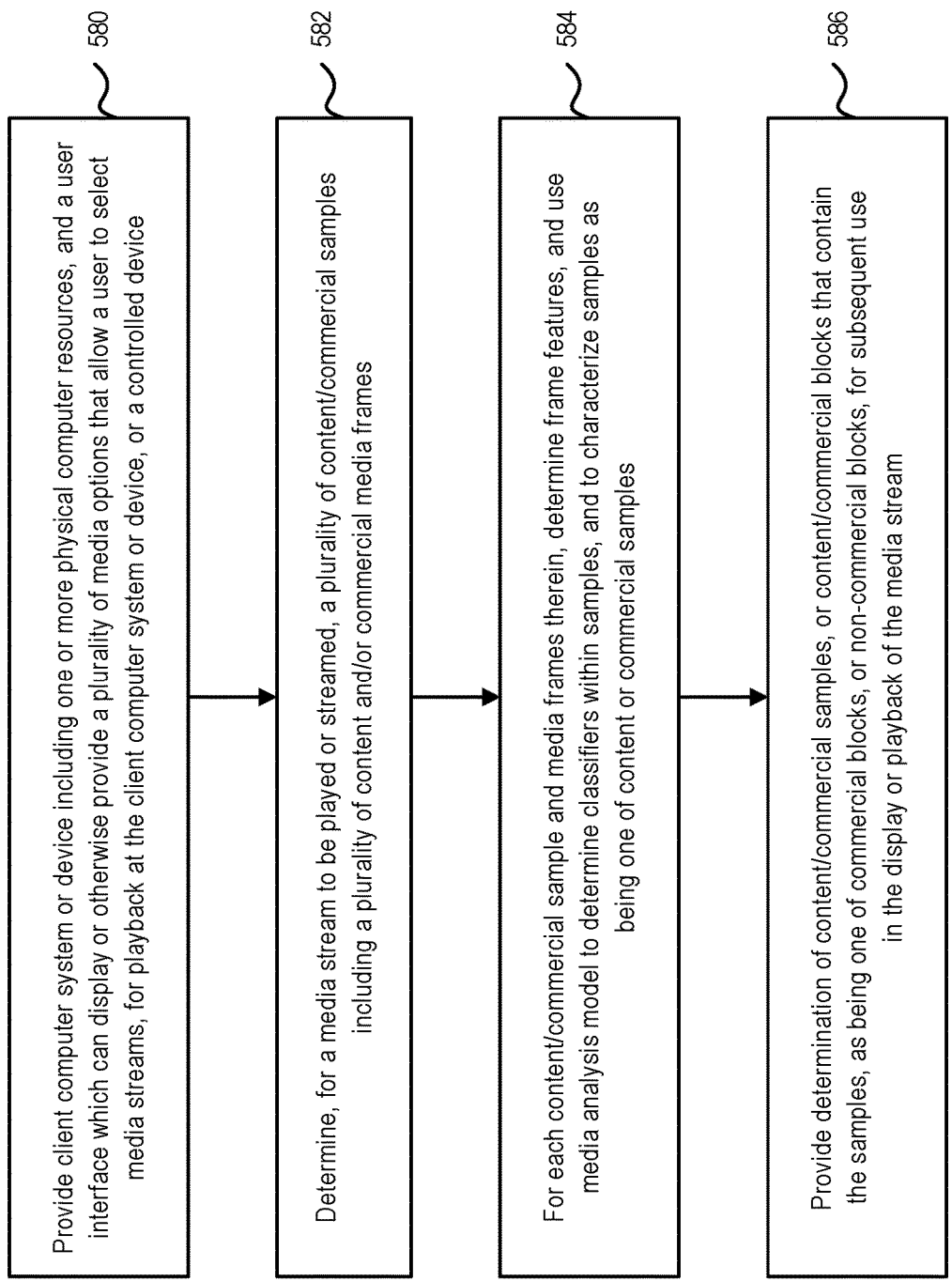
FIG. 12 is a flowchart that illustrates a method of providing commercial detection in digital media environments, in accordance with an embodiment.

FIG. 12 is a flowchart that illustrates a method of providing commercial detection in digital media environments, in accordance with an embodiment.

As shown in FIG. 12, in accordance with an embodiment, at step 580, a client computer system or device is provided, including one or more physical computer resources, and a user interface which can display or otherwise provide a plurality of media options that allow a user to select media streams, for playback at the client computer system or device, or a controlled device.

At step 582, for a media stream to be played or streamed, a plurality of content/commercial samples are determined, including a plurality of content and/or commercial media frames.

At step 584, for each content/commercial sample and frames therein, frame features are determined, and a media analysis model is used to determine classifiers within the samples, and to characterize the samples as media or commercial.

At step 586, a determination is made of content/commercial samples, or content/commercial blocks that contain the samples, as being one of a commercial block, or a non-commercial block, for subsequent use in the display or playback of the media stream.

Television and other Use Cases

As described above, in accordance with an embodiment, media streams can be used within an on-demand cloud-based media environment, which allows a user to select within a plurality of media channels, and to view or skip particular commercials.

Figure 13:
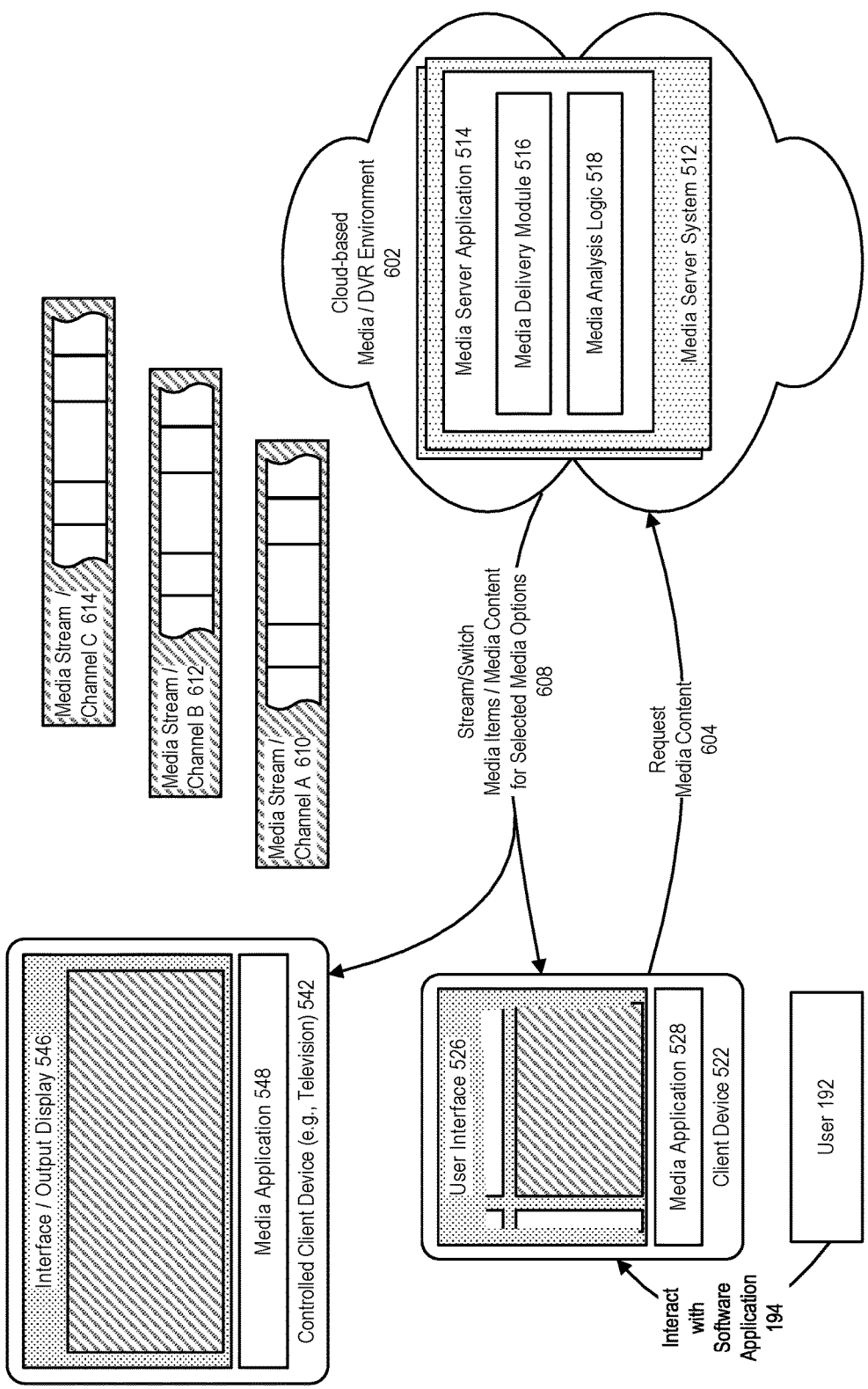
FIG. 13 illustrates a television channel use case, in accordance with an embodiment.

FIG. 13 illustrates a television channel use case, in accordance with an embodiment. As shown in FIG. 13, in accordance with an embodiment, a cloud-based media or DVR environment 602 can be provided, which enables access by client devices and controlled devices to media content provided by a plurality of media servers or media content sources. Each of the client device and/or controlled device can be adapted to display or otherwise provide a visual array of media options, for example as a two-dimensional array of media tiles, thumbnails, or other format, and to determine a user interaction or input.

In accordance with an embodiment, a user can request 604 media content be switched and/or streamed 608 to the client device or controlled device, including switching between a plurality of media streams or television channels A 610, B 612, C 614, for example by selecting a thumbnail associated with a desired media stream or television channel. A media analysis logic can be used, together with a media analysis model, to perform commercial detection in the media stream or television channel, including providing information as to the location of commercials within the stream, and using this information in controlling the display or playback of the stream.

In accordance with various embodiments, additional use cases and examples of usage can include, but are not limited to:

Filtering of television commercial thumbnails for live and time-shifted video, so that only valid program content is displayed in thumbnails.

Determining the beginning of television programs, so that time-shifted content can start accurately when programs commence, rather than starting, e.g., in a commercial block. For example, when a user selects a new television channel, stream or other media content, e.g., by selecting a thumbnail associated with that content, then instead of merely switching to a present location of a programming stream, the media player can provide a small time shift, or slip, to the end of a commercial segment within the media content. Similarly, if the user interface includes a slide device that allows a user to move forward and backwards within the playback of a media content then, when the user selects a viewing point within the media content, the media player can slip to the end of any commercial segment the user may have unknowingly placed their viewing point upon, and instead begin playback at a non-commercial segment.

Removal of original television commercials, and replacement with more precisely targeted or fresher television commercials or other content, in order to generate new revenue or personalize advertising.

Generation of ad-free premium television content which is transformed from an original television commercial-integrated programming by removal of original advertisements and re-assembly/compositing of television show segments.

Display of advertising locations on a video player timeline, with prevention or enablement of ad-skipping for content depending on content licensing agreements.

Ability to filter video search results for program or advertisement content-for example, a user may be interested in purchasing a particular brand of automobile, and wishes to search only for video advertisements related to that brand.

Ability to automatically generate previews of television shows without inclusion of commercials, with an ability to select the most optimal scenes based on feature detection.

Filtering out of closing credits, or other show content that may be of lesser interest to a user, in order to expedite viewing of a next episode for binge-style television series viewings.

The above are provided by way of example to illustrate various use cases. In accordance with other embodiments, other use cases, and examples of usage can be provided.

Figure 14:
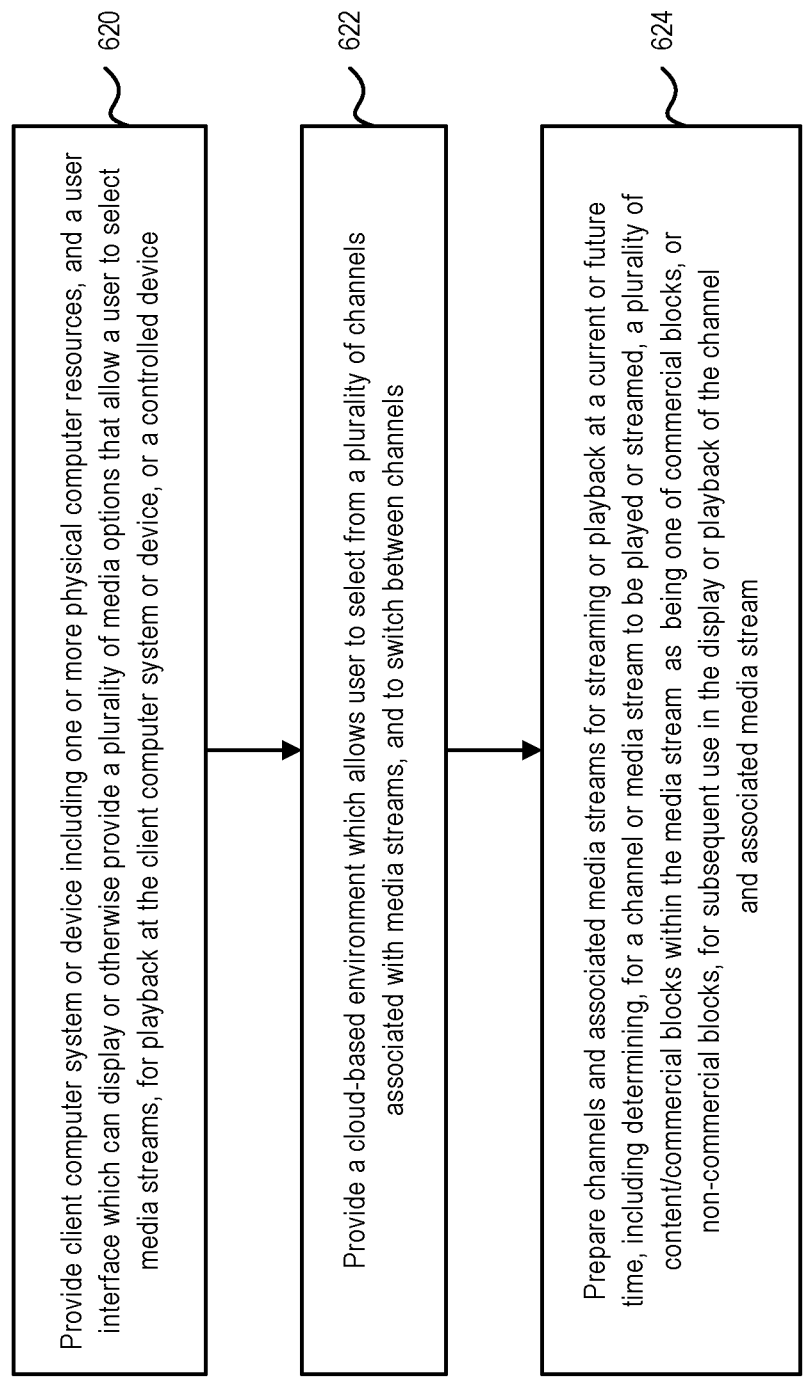
FIG. 14 is a flowchart that illustrates a method of providing a television channel use case, in accordance with an embodiment.

FIG. 14 is a flowchart that illustrates a method of providing a television channel use case, in accordance with an embodiment.

As shown in FIG. 14, in accordance with an embodiment, at step 620, a client computer system or device is provided, including one or more physical computer resources, and a user interface which can display or otherwise provide a plurality of media options that allow a user to select media streams, for playback at the client computer system or device, or at a controlled device.

At step 622, a cloud-based environment is provided, which allows the user to select from a plurality of channels associated with media streams, and to switch between channels.

At step 624, channels and associated media streams are prepared for streaming or playback at a current or future time, including determining, for a channel or media stream to be played or streamed, a plurality of content/commercial blocks within the media stream as being one of commercial blocks, or non-commercial blocks, for subsequent use in the display or playback of the channel and associated media stream.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for providing commercial detection in digital media environments, comprising:
a computer including a processor and a media server that determines within a media stream associated with a media content, a plurality of blocks of commercial content and non-commercial media content, including, for each media stream of one or more media streams:
determining, by reference to a media analysis model that is trained to associate frame features with classifiers, that the media stream comprises a plurality of content blocks that are commercial blocks or non-commercial blocks based upon a multimodal analysis, including sampling the media stream together with its commercial blocks or non-commercial blocks therein as a plurality of samples, and
processing a cumulative frame data for a plurality of media frames within each sample to determine whether a respective content block is one of a commercial block or a noncommercial block, wherein the multimodal analysis weights frame features in each sample of the plurality of samples, in determining a likelihood that its respective content block includes commercial content or non-commercial media content;
wherein the media server provides media content to a client device, wherein the client device includes a user interface and displays media options associated with media content that can be selected and provided by the media server for playing at one or more of the client device, or a controlled device; and
wherein the determination, by reference to the media analysis model, of commercial blocks, and non-commercial content blocks, within each of the one or more media streams, is used by the media server in controlling playback of selected media content to the client device or the controlled device, including:
receiving, by the media server, a media control request comprising an indication of the selected media content and an identification of a destination device being one of the client device or the controlled device, and
controlling communication of a media stream including the selected media content, to the destination device, based on the determination of commercial blocks, and non-commercial content blocks, within that media stream and the identification of the destination device included in the media control request.

2. The system of claim 1, wherein the media analysis logic is provided at the media server, and determines in real time the plurality of blocks of commercial content and non-commercial media content, for use providing the media content to the client device or controlled device.

3. The system of claim 2, wherein the media server is provided within a cloud-based environment, which receives media content to be provided to the client device or controlled device as a plurality of channels having media streams, and receives interaction requests from the client device to switch between the channels.

4. The system of claim 3, wherein the controlled device is a television or other viewing device, and wherein the client device is used to communicate interaction requests to the media server to switch between or select particular channels to be played at the television or other viewing device;
wherein the media server provides a digital video recorder function that provides the media content or the channels to the client device or the controlled device as a plurality of thumbnails, including, upon receiving a request to skip to a media content represented by a thumbnail, allowing the player to slip to an end of a commercial block within that media content.

5. The system of claim 1, wherein each of a plurality of features found in the media stream are weighted by relative importance, and components summed, to determine an overall likelihood that a particular segment or block is commercial, or noncommercial, content.

6. The system of claim 1, wherein the media analysis logic is adapted to analyze characteristics of the media frame data, including black spaces, cue points, or other segment or block information.

7. The system of claim 1, wherein the media frames are cropped to provide a cropped frame area, prior to processing of media frame data.

8. The system of claim 1, wherein the destination device is the controlled device, and wherein playback of the media stream including the selected media content is performed at the controlled device.

9. The system of claim 1, wherein the one or more media streams are provided within an on-demand cloud-based media environment that enables a user to select within a plurality of media channels, including viewing or skipping particular commercials.

10. The system of claim 1, wherein during training of the media analysis model to associate frame features with classifiers, the media server writes a training analysis to a file, including a section of the file for each sample associated with a particular time period, which sections are then associated with block classifications.

11. The system of claim 1, wherein the user interface includes a slide device that enables moving forward and backward within a playback of a media content, and whereupon a viewing point being selected within a commercial segment associated with the media content, the media server instead causes playback to begin at a non-commercial segment associated with the media content.

12. The system of claim 1, wherein a plurality of different training media streams are provided for each of different regional requirements, or different types of media channels.

13. method for providing commercial detection in digital media environments, comprising:
determining, by a computer including a processor and a media server, within a media stream associated with a selected media content, a plurality of blocks of commercial content and non-commercial media content, including, for each media stream of one or more media streams:
determining, by reference to a media analysis model that is trained to associate frame features with classifiers, that the media stream comprises a plurality of content blocks that are commercial blocks or non-commercial blocks based upon a multimodal analysis, including sampling the media stream together with its commercial blocks or non-commercial blocks therein as a plurality of samples, and
processing a cumulative frame data for a plurality of media frames within each sample to determine whether a respective content block is one of a commercial block or a noncommercial block, wherein the multimodal analysis weights frame features in each sample of the plurality of samples, in determining a likelihood that its respective content block includes commercial content or non-commercial media content;
receiving requests for media content from a client device that includes a user interface and displays media options associated with media content that can be selected and provided by the media server for playing at one or more of the client device, or a controlled device; and
controlling playback, by the media server and the determination, by reference to the media analysis model, of commercial blocks, and non-commercial content blocks, within each of the one or more media streams, of selected media content to the client device or the controlled device, including:
receiving, by the media server, a media control request comprising an indication of the selected media content and an identification of a destination device being one of the client device or the controlled device, and
controlling communication of a media stream including the selected media content, to the destination device, based on the determination of commercial blocks, and non-commercial content blocks, within that media stream and the identification of the destination device included in the media control request.

14. The method of claim 13, wherein the media server determines in real time the plurality of blocks of commercial content and non-commercial media content, for use providing the media content to the client device or controlled device.

15. The method of claim 14, wherein the media server is provided within a cloud-based environment, which receives media content to be provided to the client device or controlled device as a plurality of channels having media streams, and receives interaction requests from the client device to switch between the channels.

16. The method of claim 15, wherein the controlled device is a television or other viewing device, and wherein the client device is used to communicate interaction requests to the media server to switch between or select particular channels to be played at the television or other viewing device;
wherein the media server provides a digital video recorder function that provides the media content or the channels to the client device or the controlled device as a plurality of thumbnails, including, upon receiving a request to skip to a media content represented by a thumbnail, allowing the player to slip to an end of a commercial block within that media content.

17. A non-transitory computer readable storage medium, including instructions stored thereon which, when executed by a computer, perform the method comprising:

determining, by a computer including a processor and a media server, within a media stream associated with a selected media content, a plurality of blocks of commercial content and non-commercial media content, including, for each media stream of one or more media streams:

determining, by reference to a media analysis model that is trained to associate frame features with classifiers, that the media stream comprises a plurality of content blocks that are commercial blocks or non-commercial blocks based upon a multimodal analysis, including sampling the media stream together with its commercial blocks or non-commercial blocks therein as a plurality of samples, and processing a cumulative frame data for a plurality of media frames within each sample to determine whether a respective content block is one of a commercial block or a noncommercial block, wherein the multimodal analysis weights frame features in each sample of the plurality of samples, in determining a likelihood that its respective content block includes commercial media content or non-commercial media content;

receiving requests for media content from a client device that includes a user interface and displays media options associated with media content that can be selected and provided by the media server for playing at one or more of the client device, or a controlled device; and controlling playback, by the media server and the determination, by reference to the media analysis model, of commercial blocks, and non-commercial content blocks, within each of the one or more media streams, of selected media content to the client device or the controlled device, including:

receiving, by the media server, a media control request comprising an indication of the selected media content and an identification of a destination device being one of the client device or the controlled device, and controlling communication of a media stream including the selected media content, to the destination device, based on the determination of commercial blocks, and non-commercial content blocks, within that media stream and the identification of the destination device included in the media control request.

18. The non-transitory computer readable storage medium of claim 17, wherein the media server determines in real time the plurality of blocks of commercial content and non-commercial media content, for use providing the media content to the client device or controlled device.

19. The non-transitory computer readable storage medium of claim 18, wherein the media server is provided within a cloud-based environment, which receives media content to be provided to the client device or controlled device as a plurality of channels having media streams, and receives interaction requests from the client device to switch between the channels.

20. The non-transitory computer readable storage medium of claim 19, wherein the controlled device is a television or other viewing device, and wherein the client device is used to communicate interaction requests to the media server to switch between or select particular channels to be played at the television or other viewing device;

wherein the media server provides a digital video recorder function that provides the media content or the channels to the client device or the controlled device as a plurality of thumbnails, including, upon receiving a request to skip to a media content represented by a thumbnail, allowing the player to slip to an end of a commercial block within that media content.

* * * * *